United States Patent [19]

Hendricks et al.

[11] Patent Number: 5,600,573
[45] Date of Patent: Feb. 4, 1997

[54] OPERATIONS CENTER WITH VIDEO STORAGE FOR A TELEVISION PROGRAM PACKAGING AND DELIVERY SYSTEM

[75] Inventors: John S. Hendricks, Potomac, Md.; Richard E. Wunderlich, Alpharetta, Ga.

[73] Assignee: Discovery Communications, Inc., Bethesda, Md.

[21] Appl. No.: 352,204

[22] Filed: Dec. 2, 1994

Related U.S. Application Data

[63] Continuation-in-part of PCT/US93/11617 which is a continuation-in-part of Ser. No. 160,282, Dec. 2, 1993, which is a continuation-in-part of Ser. No. 991,074, Dec. 9, 1992.

[51] Int. Cl.$^6$ ...................................................... H04N 5/00
[52] U.S. Cl. .......................................... 364/514 R; 348/6
[58] Field of Search ........................... 364/514 R, 514 C; 348/6, 7, 13; 379/105, 101; 455/3.2, 4.2; 358/310

[56] References Cited

U.S. PATENT DOCUMENTS

| 3,891,792 | 6/1975 | Kimura . |
| 4,361,848 | 11/1982 | Poignet et al. . |
| 4,484,217 | 11/1984 | Block et al. . |

(List continued on next page.)

FOREIGN PATENT DOCUMENTS

| 2044574 | 12/1992 | Canada . |
| 187961 | 7/1986 | European Pat. Off. . |
| 243312 | 10/1987 | European Pat. Off. . |
| 355697 | 2/1990 | European Pat. Off. . |
| 402809 | 12/1990 | European Pat. Off. . |
| 420123 | 4/1991 | European Pat. Off. . |
| 425834 | 5/1991 | European Pat. Off. . |
| 424648 | 5/1991 | European Pat. Off. . |
| 506435 | 9/1992 | European Pat. Off. . |

(List continued on next page.)

OTHER PUBLICATIONS

1993 Technical Series, Moloney, Jun. 6, 1993.
Olshansky, Subscriber Dist. Networks Using Compressed Digital Video, Journ. of Lightwave Tech., vol. 10, No. 11, Nov. 1992, pp. 1760–1765.
Bestler, Flexible Data Structures and Interface Rituals for Rapid Dev. of OSD Application, NCTA Tech. Papers, Jun. 6, 1993, pp. 223–236.
Gelman, et al., A Store–and–Forward Architecture for Video–on–Demand Serv., Jun. 21, 1991, IEEE, pp. 842–846.
Reimer, Memories in My Pocket, Feb. 1991, State of the Art Laptop Technologies, pp. 251–258.
Dinaro, Markets and Products Overview, pp. 135–148, 1991.
H. van den Boom, An Interactive Videotex System for Two–Way CATV Networks, pp. 397–401, Nov.–Dec. 1986.
Sharpless, "Subscription Teletext for Value Added Services," 8087 IEEE, pp. 283–289, 1985.

*Primary Examiner*—Ellis B. Ramirez
*Assistant Examiner*—Thomas Peeso
*Attorney, Agent, or Firm*—Dorsey & Whitney LLP

[57] ABSTRACT

The present invention is an operations center that organizes and packages television programs for transmission in a television delivery system. The center is capable of receiving, storing, packaging and delivering countless programs in various signal formats. The center is a particularly useful invention for program delivery systems which will provide subscribers with video on demand, near video on demand and/or the ability to select programs from on-screen menus. The center's primary components are a receiver, system controller, video storage, computer assisted packaging system (CAP) and output equipment. The components can receive, convert, store, select, retrieve, encode and otherwise process multiple program signals, gather program identities of analog and/or digital programs, generate menus, package programs efficiently based on subscriber needs and the available bandwidth, and output packaged program products to multiple remote sites. To perform these functions, the CAP creates program lineups, menus, instructions on the packaging of programs, and/or allocates available bandwidth. In the preferred embodiment, the packaged program products contain programs, control information, and menus.

69 Claims, 8 Drawing Sheets

U.S. PATENT DOCUMENTS

| | | |
|---|---|---|
| 4,488,179 | 12/1984 | Kruger et al. . |
| 4,605,964 | 8/1986 | Chard . |
| 4,639,225 | 1/1987 | Washizuka . |
| 4,688,218 | 8/1987 | Blineau et al. . |
| 4,688,246 | 8/1987 | Eilers et al. . |
| 4,697,209 | 9/1987 | Kiewit et al. . |
| 4,706,121 | 11/1987 | Young . |
| 4,712,105 | 12/1987 | Kohler . |
| 4,724,491 | 2/1988 | Lambert ................................. 358/310 |
| 4,792,972 | 12/1988 | Cook, Jr. . |
| 4,816,901 | 3/1989 | Music et al. . |
| 4,829,558 | 5/1989 | Welsh . |
| 4,829,569 | 5/1989 | Seth-Smith et al. . |
| 4,860,379 | 8/1989 | Schoeneberger et al. . |
| 4,876,736 | 10/1989 | Kiewit . |
| 4,928,168 | 5/1990 | Iwashita . |
| 4,947,429 | 8/1990 | Bestler et al. . |
| 4,949,187 | 8/1990 | Cohen . |
| 4,959,810 | 9/1990 | Darbee et al. . |
| 4,961,109 | 10/1990 | Tanaka . |
| 4,975,951 | 12/1990 | Bennett . |
| 4,977,455 | 12/1990 | Young . |
| 4,995,078 | 2/1991 | Monslow et al. . |
| 4,996,597 | 2/1991 | Duffield . |
| 5,001,554 | 3/1991 | Johnson et al. . |
| 5,014,125 | 5/1991 | Pocock et al. . |
| 5,015,829 | 5/1991 | Eilert et al. . |
| 5,020,129 | 5/1991 | Martin et al. . |
| 5,027,400 | 6/1991 | Baji et al. . |
| 5,036,394 | 7/1991 | Morii et al. . |
| 5,036,537 | 7/1991 | Jeffers et al. . |
| 5,046,093 | 9/1991 | Wachob . |
| 5,047,867 | 9/1991 | Strubbe et al. . |
| 5,049,990 | 9/1991 | Kondo et al. . |
| 5,057,917 | 10/1991 | Shalkauser et al. . |
| 5,077,607 | 12/1991 | Johnson et al. . |
| 5,078,019 | 1/1992 | Aoki . |
| 5,091,782 | 2/1992 | Krause et al. . |
| 5,093,718 | 3/1992 | Hoarty et al. . |
| 5,099,319 | 3/1992 | Esch et al. . |
| 5,105,268 | 4/1992 | Yamanouchi et al. . |
| 5,130,792 | 7/1992 | Tindell et al. . |
| 5,132,789 | 7/1992 | Ammon et al. . |
| 5,132,992 | 7/1992 | Yurt et al. . |
| 5,133,079 | 7/1992 | Ballantyne et al. . |
| 5,144,663 | 9/1992 | Kudelski et al. . |
| 5,150,118 | 9/1992 | Finkle et al. . |
| 5,151,782 | 9/1992 | Ferraro ................................. 348/7 |
| 5,151,789 | 9/1992 | Young . |
| 5,152,011 | 9/1992 | Schwob . |
| 5,155,591 | 10/1992 | Wachob . |
| 5,166,886 | 11/1992 | Molnar et al. . |
| 5,172,413 | 12/1992 | Bradley et al. . |
| 5,182,639 | 1/1993 | Jutamulia et al. . |
| 5,202,817 | 4/1993 | Koenck et al. . |
| 5,206,722 | 4/1993 | Kwan . |
| 5,206,954 | 4/1993 | Inoue et al. ................................. 348/6 |
| 5,216,515 | 6/1993 | Steele et al. . |
| 5,223,924 | 6/1993 | Strubbe . |
| 5,237,311 | 8/1993 | Mailey et al. . |
| 5,247,347 | 9/1993 | Litteral et al. . |
| 5,253,066 | 10/1993 | Vogel . |
| 5,253,275 | 10/1993 | Yurt et al. . |
| 5,260,778 | 11/1993 | Kauffman et al. . |
| 5,289,271 | 2/1994 | Watson . |
| 5,293,540 | 3/1994 | Trani et al. . |
| 5,319,455 | 6/1994 | Hoarty et al. . |
| 5,323,240 | 6/1994 | Amano et al. . |
| 5,327,554 | 6/1994 | Palazzi, III et al. ................ 348/13 |
| 5,339,315 | 8/1994 | Maeda et al. . |
| 5,341,166 | 8/1994 | Garr et al. . |
| 5,341,474 | 8/1994 | Gelman et al. . |
| 5,343,239 | 8/1994 | Lappington et al. ................ 348/13 |
| 5,345,594 | 9/1994 | Tsuda . |
| 5,353,121 | 10/1994 | Young et al. . |
| 5,355,162 | 10/1994 | Yazolino et al. . |
| 5,357,276 | 10/1994 | Banker et al. . |
| 5,367,571 | 11/1994 | Bowen et al. . |
| 5,375,068 | 12/1994 | Palmer et al. ................ 364/514 C |
| 5,404,393 | 4/1995 | Remillard . |
| 5,410,326 | 4/1995 | Goldstein . |
| 5,410,344 | 4/1995 | Graves et al. . |
| 5,414,426 | 5/1995 | O'Donnell et al. . |
| 5,416,508 | 5/1995 | Sakuma et al. . |
| 5,432,542 | 7/1995 | Thibadeau et al. . |
| 5,473,362 | 12/1995 | Fitzgerald et al. . |
| 5,477,263 | 12/1995 | O'Callaghan et al. . |
| 5,479,268 | 12/1995 | Young et al. . |
| 5,481,294 | 1/1996 | Thomas et al. . |

FOREIGN PATENT DOCUMENTS

| | | |
|---|---|---|
| 513763 | 11/1992 | European Pat. Off. . |
| 3423846 | 1/1986 | Germany . |
| 3935294 | 4/1991 | Germany . |
| 61-06015 | 3/1986 | Japan . |
| 62-24777 | 2/1987 | Japan . |
| 1130683 | 5/1989 | Japan . |
| 1142918 | 6/1989 | Japan . |
| 3114375 | 5/1991 | Japan . |
| 3198119 | 8/1991 | Japan . |
| 5250106 | 9/1993 | Japan . |
| 1204190 | 9/1970 | United Kingdom . |
| 2168227 | 6/1986 | United Kingdom . |
| 8601962 | 3/1986 | WIPO . |
| 8909528 | 10/1989 | WIPO . |
| 9010988 | 9/1990 | WIPO . |
| 9100670 | 1/1991 | WIPO . |
| 9103112 | 3/1991 | WIPO . |
| 9212599 | 7/1992 | WIPO . |
| 9211713 | 7/1992 | WIPO . |
| 9217027 | 10/1992 | WIPO . |
| 9221206 | 11/1992 | WIPO . |
| 9322877 | 11/1993 | WIPO . |

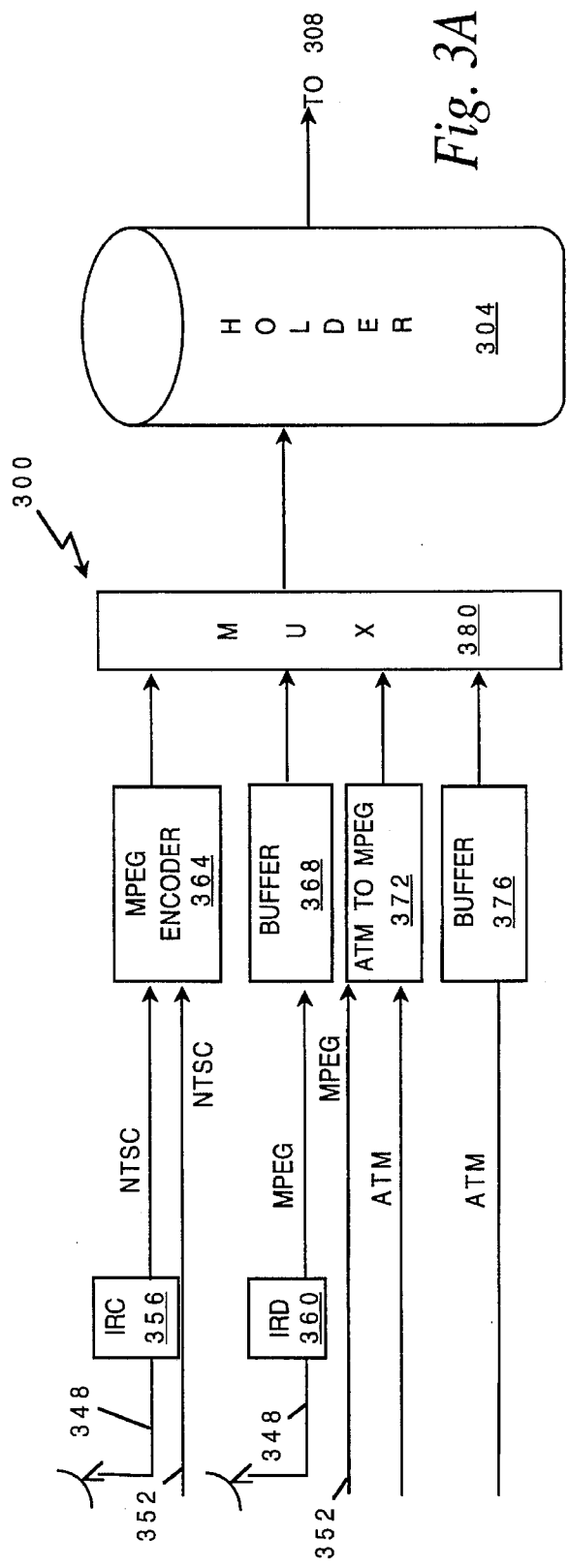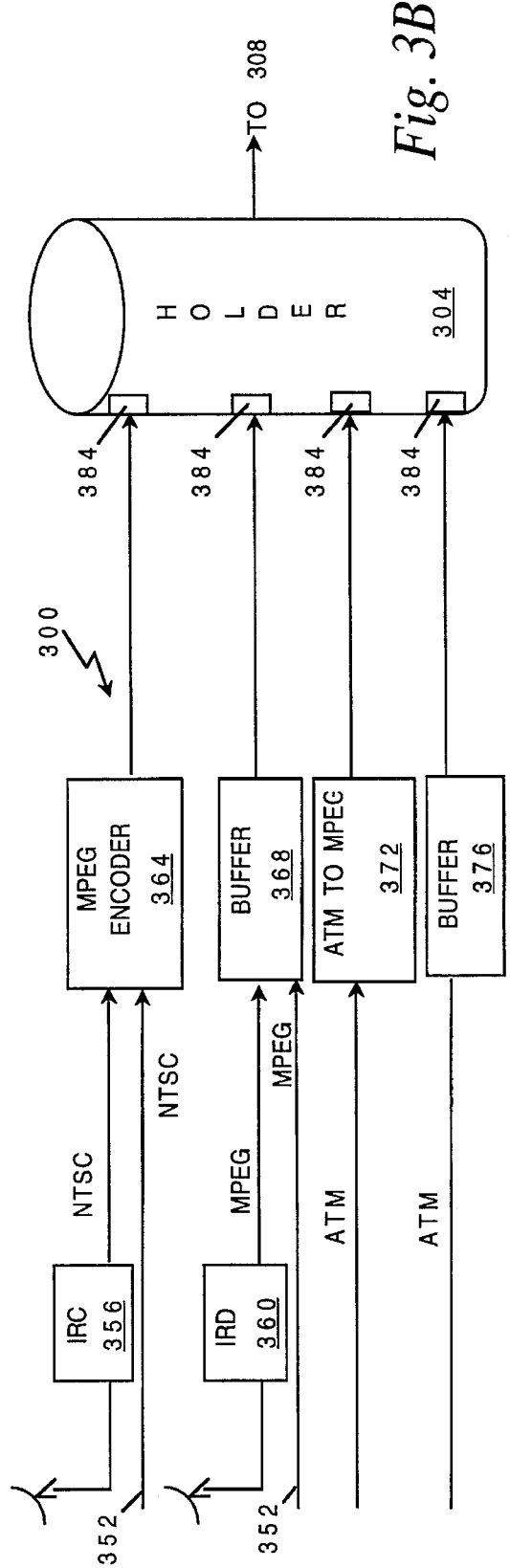

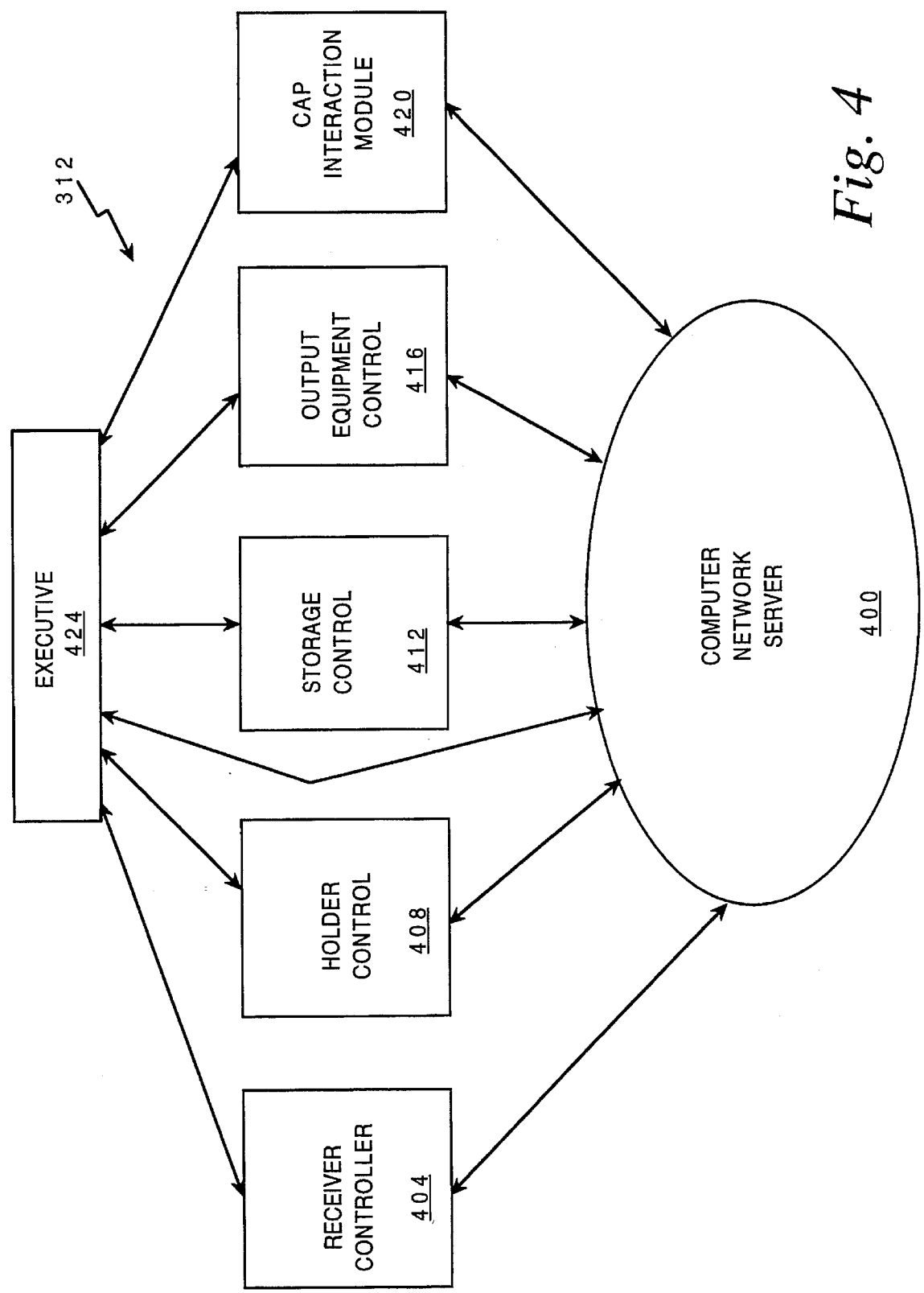

OPERATIONS CENTER WITH VIDEO STORAGE FOR A TELEVISION PROGRAM PACKAGING AND DELIVERY SYSTEM

RELATED APPLICATIONS

This application is a continuation-in-part of application PCT/US93/11617 and U.S. Ser. No. 08/160,282, entitled AN OPERATIONS CENTER FOR A TELEVISION PROGRAM PACKAGING AND DELIVERY SYSTEM filed Dec. 2, 1993, which is a continuation-in-part of U.S. Ser. No. 07/991,074 filed Dec. 9, 1992, entitled TELEVISION PROGRAM PACKAGING AND DELIVERY SYSTEM WITH MENU DRIVEN SUBSCRIBER ACCESS. The following other continuation-in-part applications, also based on the above-referenced patent applications, are incorporated herein by reference:

PCT/US93/11708 and U.S. Ser. No. 08/160,281, entitled REPROGRAMMABLE TERMINAL FOR SUGGESTING PROGRAMS OFFERED ON A TELEVISION PROGRAM DELIVERY SYSTEM filed Dec. 2, 1993;

PCT/US93/11616 and U.S. Ser. No. 08/160,280, entitled NETWORK CONTROLLER FOR CABLE TELEVISION DELIVERY SYSTEMS filed Dec. 2, 1993;

PCT/US93/11618 and U.S. Ser. No. 08/160,193, entitled SET-TOP TERMINAL FOR CABLE TELEVISION DELIVERY SYSTEMS filed Dec. 2, 1993;

PCT/US93/11606 and U.S. Ser. No. 08/160,194, entitled ADVANCED SET-TOP TERMINAL FOR CABLE TELEVISION DELIVERY SYSTEMS filed Dec. 2, 1993;

PCT/US93/11615 and U.S. Ser. No. 08/160,283, entitled DIGITAL CABLE HEADEND FOR CABLE TELEVISION DELIVERY SYSTEM filed Dec. 2, 1993;

PCT/US93/11706 and U.S. Ser. No. 08/160,191, entitled TELEVISION PROGRAM DELIVERY SYSTEM filed Dec. 2, 1993; and U.S. Ser. No. 08/336,247, entitled ELECTRONIC BOOK SELECTION AND DELIVERY SYSTEM, filed Nov. 7, 1994.

TECHNICAL FIELD

The invention relates to television entertainment delivery systems that provide television programming to consumer homes. More particularly, the invention relates to an operations center that organizes and packages cable television programming for delivery to consumer homes.

BACKGROUND ART

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. In order for new television entertainment products to be successful, the products must satisfy consumer demands. TV consumers wish to go from limited viewing choices to a variety of choices, from no control of programming to complete control. Consumers do not wish to pay for one hundred channels when due to lack of programming information, they seldom, if ever, watch programming on many of these channels.

The concepts of interactive television, high definition television and 300–500 channel cable systems in consumer homes will not sell if they are not packaged, delivered and presented in a useable fashion to consumers. The problem is that TV programming is not being managed, packaged, delivered, and presented to consumers in a user friendly manner.

Consumers are already being bombarded with programming options, numerous "free" cable channels, subscription cable channels and pay-per-view choices. Any further increase in TV entertainment choices will likely bewilder viewers with a mind-numbing array of choices.

The TV industry has traditionally marketed and sold its programs to consumers in bulk, such as continuous feed broadcast and long-term subscriptions to movie channels. The TV industry is unable to sell its programming in large quantities on a per unit basis, such as the ordering of one program.

In today's television world networks manage the program lineup for individual channels. Each network analyzes ratings for television shows and determines the appropriate schedule or program lineup to gain market share and revenue from advertising. Since each channel is in competition with every other channel, there is no coordinated effort to organize or package television programming in a manner that primarily suits the viewers.

Additionally, viewership fragmentation, which has already begun to decrease a channel's or program's market share, will increase. Programming not presented in a user friendly manner will suffer with a decrease in viewership and revenue.

And finally, with the imminent introduction of digital television technology, current television delivery systems do not have the capabilities or features necessary to operate in the digital environment.

What is needed is a distribution point for programs.

What is needed is a method of organizing programming to be offered to viewers.

What is needed is a television program delivery system that can be operated in a distributive fashion and controlled from one or more national centers.

What is needed is an operations center for a system which can gather television programming in a variety of formats, package the programs, deliver the programs, and present the programs through a user friendly interface which allows the consumer to easily select from among the many program choices.

What is needed is an operations center that is capable of handling hundreds of programs in different formats.

What is needed is an operations center that is expandable for future types of programming.

What is needed is needed is an operations center that can control certain features and software of a television delivery system.

What is needed is an operations center that operates in the digital audio/video environment.

What is needed is an operations center that formulates program menus for viewer use.

What is needed is a computer assisted program packaging system.

What is needed is an operations center that includes a method for billing consumers.

What is needed is an operations center that analyzes data on programs watched by viewers.

The present invention is addressed to fulfillment of these needs.

BRIEF SUMMARY OF INVENTION

This invention is a center for controlling the operations of a television program delivery system. Specifically, the present invention is an operations center that organizes and packages television programs for transmission in a television delivery system.

The operations center is the nerve center of the television program delivery system. The center is capable of receiving, storing, packaging and delivering countless television programs. It receives data on viewership behavior and utilizes the data to assist in packaging programs for future viewing. The operations center is a particularly useful invention for television delivery systems which will provide subscribers with video on demand, near video on demand and/or the ability to select programs from on-screen menus.

The operations center's primary components are a receiver, system controller, video storage, computer assisted packaging system and output equipment. The operations center receives multiple video signals and outputs packaged program products to multiple remote sites. In the preferred embodiment, the packaged program products contain programs, control information, and subscriber menus.

The operations center receives multiple video inputs from external and/or internal sources in various signal and video data formats. The operations center performs any processing of the signal that is necessary, such as converting to different video data formats, and then stores the video data. After determining the manner in which the video data should be packaged, such as the program identifies and video format, the operations center packages and sends the video to one or more remote sites, such as a cable headend. The manner in which the operations center's product is packaged for a particular remote site is preferably customized and includes a customized program control signal with program identities.

The computer assisted packaging system (CAP) creates the program lineup (and/or instructions on the packaging of programs) and the packaging of menu and control information for later transmission and use in the cable television systems. The CAP can be specially designed to generate graphical menu displays for user selection of programs. The CAP hardware and software for customizing packages of transmitted program signals is particularly useful in large television delivery systems which include multiple satellite and terrestrial transmissions to cable headends.

The software of the CAP performs the functions of gathering program identities of analog and/or digital program signals from a variety of sources such as broadcast television, premium channels, tape and video disk. The software causes the programs to be packaged efficiently for the available bandwidth and for subscriber viewing through computer assisted creation of program line-up and allocating of bandwidth. The line-ups are created to effectively group programming for display in menus by categories. The television programs are then packaged for transmission by the operations center with the program control information (such as cost for viewing certain program) and menu information.

The operations center of the present invention provides a method for remote management and control of video on demand, near video on demand, local cable and CATV programs available, and on-screen menu displays shown to subscribers. The operations center's computer software programs and hardware provide both "real-time" and advance control over cable and CATV systems. By transmitting appropriate control information the operations center has the ability to change allocation of programs across physical channels, change video on demand programs available, update menu information (from the operations center location), reprogram menu formats and menu flow, and change or augment a packaged program signal sent or programs made available to a particular region of the country. The operations center is able to control remotely certain features and software of the cable headend and set top terminals and if necessary reprogram menu display software stored at the cable headend or set top terminals.

In order to properly manage program lineups, the operations center acquires viewer information on programs watched. Such viewer information includes information about the buy rates of specific shows, viewer preferences for programming, and the like, gathered by recording viewer transactions. A compilation of viewer information data is needed in order to make decisions on future individualized program lineup and program packaging. In addition, allocation of menu space and construction of menus is aided by the use of viewer information data. This information is usually received from the cable headends and processed using market research techniques.

The present invention is not only able to operate in the digital environment but introduces many new features to television program delivery.

It is an object of this invention to provide a system for efficiently organizing television programs to be offered to viewers.

It is an object of this invention to provide an operations center for a television program delivery system.

It is an object of this invention to provide an operations center for a television program delivery system which can gather television programming in a variety of formats, package the programs, and deliver the packaged programs.

It is an object of this invention to provide an operations center for a program delivery system which presents programming viewing options to the consumer through a user friendly interface which allows the consumer to easily select from among the many program choices.

It is an object of this invention to provide an operations center that is capable of handling video/audio programming in different formats.

It is an object of this invention to provide an operations center capable of offering interactive television, video on demand, high definition television (HDTV) and/or other advanced television features.

It is an object of this invention to provide an operations center that can control software and program features at the cable headend.

It is an object of this invention to provide an operations center that can control and if necessary reprogram set top terminals.

It is an object of this invention to provide an operations center for a digital program delivery system.

It is an object of this invention to provide an operations center that designs program menus.

It is an object of this invention to provide an operations center that uses data on programs viewed to create or aid in the selection of program line-ups.

It is an object of this invention to provide a computer assisted program packaging system for a television program delivery system.

These and other objects and advantages of the invention will become obvious to those skilled in the art upon review of the following description, the attached drawings and appended claims.

BRIEF DESCRIPTION OF DRAWINGS

FIG. 3a is a schematic of the components of a receiver with a single connection to the holder.

FIG. 3b is a schematic of a receiver with multiple connections to the holder.

FIG. 4 is a schematic of the system controller.

DISCLOSURE OF INVENTION, BEST MODE FOR CARRYING OUT INVENTION, INDUSTRIAL APPLICABILITY, AND DETAILED DESCRIPTION

A. Television Program Delivery System Description

1. Introduction

Figure 1:
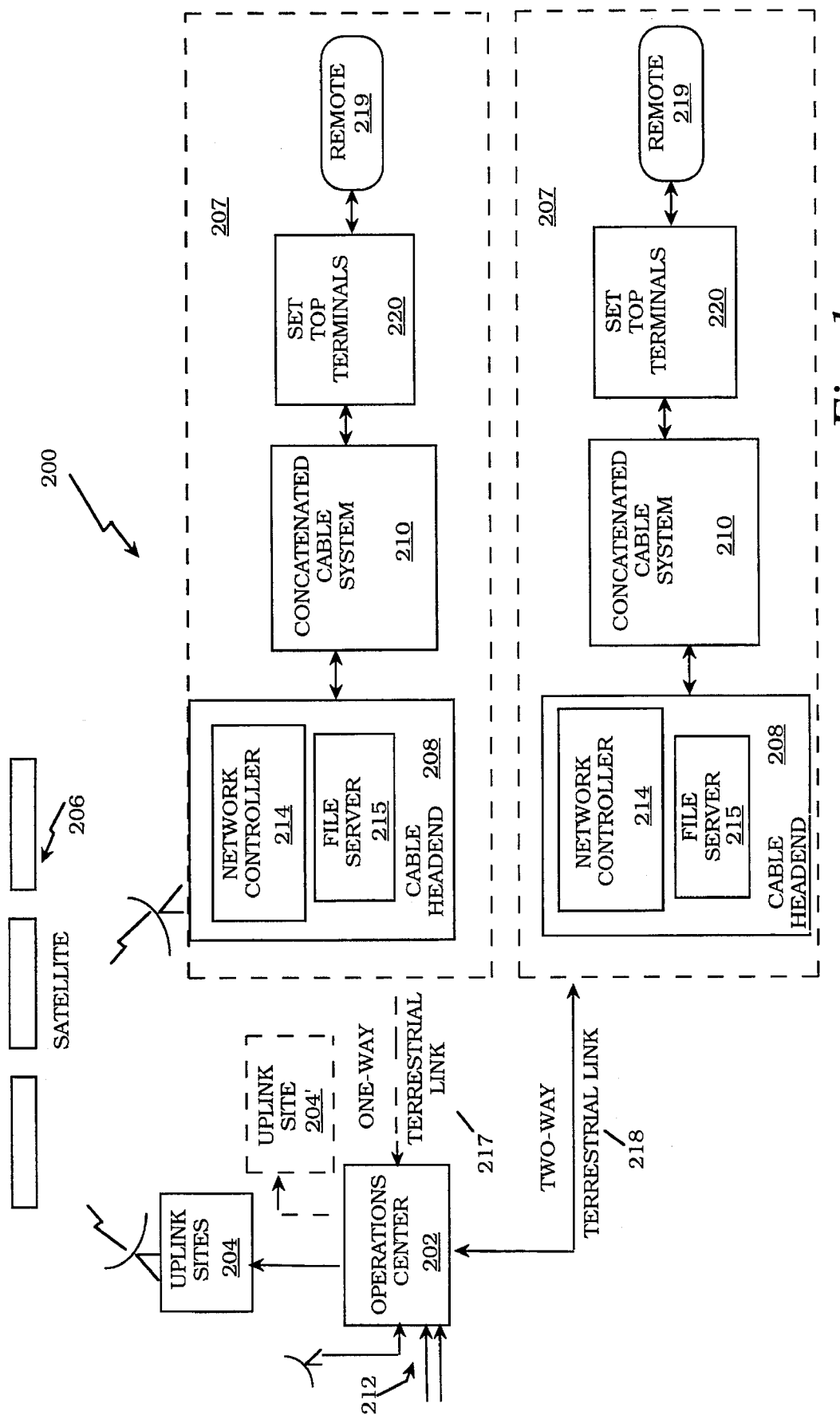
FIG. 1 is a diagram of the primary components of the television delivery system.

FIG. 1 shows the present invention as part of an expanded cable television program delivery system 200 that dramatically increases programming capacity using compressed transmission of television program signals and video storage. Developments in digital bandwidth compression technology now allow much greater throughput of television program signals over existing or slightly modified transmission media. Video file servers provide greater storage capacity and quicker retrieval of stored programs than most other storage media. The program delivery system 200 shown provides subscribers with a user friendly interface to operate and exploit the increase in current program delivery capability. In addition, video on demand of the subscriber and near video on demand is possible with this new delivery system.

Subscribers are able to access an expanded television program package and (with the appropriate set top terminal and remote) view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button (or by pressing the actual two or more digit numeric number assigned to a selection). Thus, with the press of a single button, the subscriber can advance from one menu to the next. In this fashion, the subscriber can sequence the menus and select a program from any given menu. The programs are grouped by category so that similar program offerings are found on the same menu.

2. Major Delivery System Components

In its most basic form, the system uses a program delivery system 200 in conjunction with a conventional concatenated cable television system 210. The program delivery system 200 generally includes (i) at least one operations center 202, where program packaging and control information are created and then assembled in the form of digital data, (ii) a digital distribution system, where the digital data is compressed, combined/multiplexed, encoded, and mapped into digital signals as necessary for satellite 206 or terrestrial 218 transmission to the cable headend 208, (iii) a cable headend or remote site 208 for receiving and distributing program signals, and (iv) a set of in-home set top terminals 220 and remote controls 219. The program delivery system 200 transports digital signals or analog signals to the cable headend 208 via satellite 206 or terrestrial 218 link. The signals are then transmitted by the cable headend through a concatenated cable television system 210. Within the cable headend 208, the received signals may be decoded, demultiplexed, managed by a local central distribution and switching mechanism (such as network controller or network manager 214), stored by a file server 215, combined and then transmitted to the set top terminal 220 located in each subscriber's home over the cable system 210. Although concatenated cable systems 210 are the most prevalent transmission media to the home, telephone lines, cellular networks, fiberoptics, Personal Communication Networks satellite communication, and similar technology for transmitting to the home can be used interchangeably with this program delivery system 200.

The delivery system 200 generally has a reception region 207 with decompression capability. This capability is performed by a decompressor housed within a set top terminal 220 or at the cable headend 208. The decompressor remains transparent from the subscriber's point of view and allows any compressed signal to be decompressed. The decompressed video signals are usually simultaneously converted into analog signals for television display. Such analog signals include NTSC formatted signals for use by a standard television. Various digital compression techniques such as MPEG may be used with the system 200. The subscriber interface is a device with buttons located on the set top terminal 220 or on a portable remote control 219. In the preferred system embodiment, the subscriber interface is a combined alpha-character, numeric and iconic remote control device 219, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface.

3. Operations Center Overview

Figure 2:
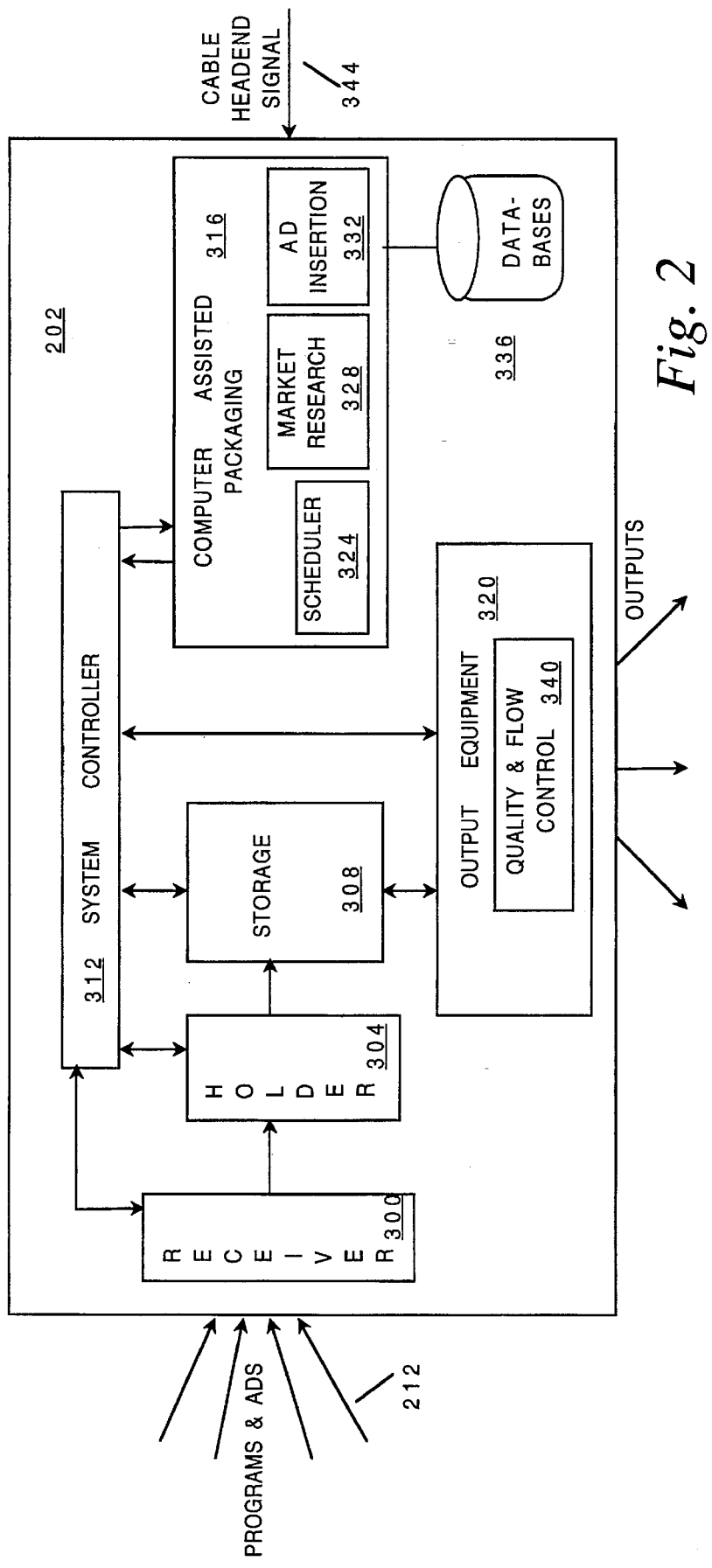
FIG. 2 is a block diagram of the primary components of the operations center.

The operations center 202 performs two primary services, packaging television programs for transmission and generating the program control information signal. At the operations center 202, many television programs are received from external program sources in either analog and digital form. FIGS. 1 and 2 show an embodiment of the operations center receiving signals from various external sources 212. Examples of the external program sources are networks, sporting events, children's programs, specialty channels, news, advertisements, infomercials or any other program source that can provide audio or visual signals. Once the programs are received from the external program sources 212, the operations center 202 digitizes (and preferably compresses) any program signals received in analog form. Preferably, the operations center 202 also maintains an internal storage of programs. The internally stored programs may be in analog or digital form and stored on permanent or volatile memory sources, including magnetic tape or RAM or a video file server system.

Subsequent to receiving programming, the operations center 202 packages the programs into the groups and categories which provide the optimal marketing of the programs to remote sites, cable headends, and subscribers. For example, the operations center 202 may package the same programs into different categories and menus for weekday, prime-time viewing and Saturday afternoon viewing. Also, the operations center 202 packages the television programs in a manner that enables both the various menus to easily represent the programs, and the subscribers to easily access the programs through the menus. These packets of programs, menus and control information are then transmitted to cable headends or remote sites 208. FIG. 1 shows that cable headends 208 may be serviced by the operations center 202 using satellites 206, one-way terrestrial links (not shown), and two-way terrestrial links 218. A return path from the cable headend 208 to operations center 202, such as one-way terrestrial link 217 or two-way terrestrial link 218, carries cable headend data to the operations center 202.

With respect to FIGS. 1 and 2, the scheduling or packaging determinations for the digital signals is typically performed at the operations center 202 by computer assisted packaging equipment (CAP) 316. The CAP system 316 normally includes at least one computer monitor, keyboard, and mouse. A packager packages the signals by entering certain information into the CAP 316. This information includes the date, time slot (if necessary), and program category of the various programs. The packager and the CAP 316 utilize demographic data, buy data, and ratings in performing the packaging tasks. After the packager selects the various programs from a pool of available programs and inputs the requisite information, the packager, with assistance from the CAP 316, can select the price and allocate satellite transponder space or a terrestrial link for the various programs. After the process is complete, the CAP 316 displays draft menus or program schedules that correspond to the entries of the programmer. The CAP 316 may also graphically display allocation of satellite transponder space. The packager may edit the menus and satellite transponder allocation several times until satisfied with the programming schedule. During the editing, the packager may direct the exact location of any program name on a menu with simple commands to the CAP 316.

The packaging process also accounts for any groupings by satellite transponder which are necessary. The operations center 202 may send different groups of programs to different cable headends 208 and/or set top terminals 220. One way the operations center 202 may accomplish this task is to send different program packages to each satellite transponder. Each satellite transponder, or set of transponders, then relays specific program packages to specific cable headends 208 and/or set top terminals 220.

Alternatively, the operations center 202 may send programs and control information by satellite for reception by many remote sites. Customizing may still be performed with this technique. Using this technique, customized control signals directed at specific remote sites are sent with the programs. The customized control signals inform the remote site of programs to accept and store (and those programs to ignore). The allocation of satellite transponder space is an important task performed by the operations center 202. This customized grouping of programs for a particular remote site is more easily accomplished using direct terrestrial links, such as ATM (Asynchronous Transfer Mode) or direct leased lines.

The operations center 202 may also "insert" customized directions for filling local available program time in the packaged signal to enable local cable and television companies to fill the program time with local advertising and/or local programming, as well as customized menus.

After the CAP 316 determines the packages of programs, it creates a program control information signal to be delivered with the program package to the cable headend 208 and/or set top terminal 220. The program control information signal contains a description of the contents of the program package (including program lineup information and categories), commands to be sent to the cable headend 208 and/or set top terminal 220, menu information, scheduled transmission times and other information relevant to the signal transmission.

In addition to packaging the signal, the operations center 202 employs digital compression techniques to increase existing transmission capacity. A number of digital compression algorithms currently exist which can achieve the increase in capacity and improved signal quality desired for the system. The algorithms generally use one or more of three basic digital compression techniques: (1) within-frame (intraframe) compression, (2) frame-to-frame (interframe) compression, and (3) within carrier compression. Specifically, in the preferred embodiment, the MPEG 2 digital data format (which includes a compression method) is used. After digitizing, the signals are combined (multiplexed) and encoded. The combined signal is subsequently transmitted by terrestrial links or to various uplink sites 204.

There may be a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, upconverted and amplified for transmission over satellite. Multiple cable headends 208 may receive such transmissions and the transmissions may be customized for specific headends as described above.

In addition to multiple uplinks, the delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently. Alternatively, the operations center 202 may operate independently.

4. Cable Headend or Remote Site

After the operations center 202 has packaged and transmitted the program signals, the cable headend or remote site 208 receives and further processes the signals before they are relayed to each set top terminal 220. Each cable headend site is generally equipped with multiple satellite receiver dishes and terrestrial links. Each dish is capable of handling multiple transponder signals from a single satellite and sometimes from multiple satellites.

With reference to FIG. 1, as an intermediary between the set top terminals 220 and the operations center 202 (and uplink site 204), the cable headend 208 performs two primary functions. First, the cable headend 208 acts as a distribution center, or signal processor, by relaying the program signal to the set top terminal 220 in each subscriber's home. Second, the cable headend 208 acts as a network controller or manager 214 by receiving information from each set top terminal 220, responding to the set top terminal, and passing such information on to an information gathering site such as the operations center 202. Thus, the cable headends 208 may be a conduit to an operations center 202 in an operations center 202 video on demand system, where the cable headend 208 simply passes video on demand requests to the operations center 208. The operations center 208 responds to the video on demand request by sending the requested program to the cable headend 208 for distribution to the requesting subscribers.

Also, the local cable headends 208 are not constrained to showing only programs transmitted from the operations center 202. New set top converters will incorporate both digital and analog channels. Therefore, the cable headend 208 may combine analog signals with the digital signals prior to transmitting the program signals to the set top terminals 220. Further, the cable headends 208 may store programs in local file servers 214 for later distribution. The cable headends 208 may also receive programs from other sources, possibly from other operations centers.

B. Detailed Description of Operations Center

FIG. 2 is a high-level block diagram of the operations center 202. The operations center 202 has five primary components: a receiver 300, a storage device 308, a system controller 312, computer-assisted packaging system (CAP) 316, and output equipment 320. The receiver 300 receives multiple video/audio programs and advertisements 212 from external sources (not shown). The programs and advertisements may be in various signal formats and video formats (e.g., HDTV). The receiver 300 is under the control of the system controller 312. Preferably, there is a two-way communication link between the system controller 312 and the receiver 300. The storage device 308 receives programs and advertisements 212 either directly from the receiver 300 or through the optional holder 304. The storage device 308 stores some or all of the received programs and advertisements 212.

Although not required for the functioning of the system, it is preferred that the storage device also be capable of spooling the programs and advertisements 212 stored. The storage device 308 spools the programs and advertisements 212 preferably directly to the output equipment 320. As with the receiver 300, the storage device 308 is preferably under the control of the system controller 312. A video file server 215 with a redundant array of independent disks (RAID) is the primary and preferred hardware component for the storage and spooling device 308. A simple example of a video file server is described in U.S. Pat. No. 5,262,875, entitled AUDIO/VIDEO FILE SERVER INCLUDING DECOMPRESSION/PLAYBACK MEANS, issued on Nov. 16, 1993, incorporated herein by reference.

The video file server hardware and software acts as a bulk storage and control center capable of spooling video. The file server stores hundreds of hours of programming and is able to control or interface with many distribution ports or distributions servers. Output capacities of thousands of configurable ports are possible. The file servers may be built modularly for upgrading. Configurable storage space, local inventory and local configuration control is preferred. Other large scale storage devices capable of storing video and audio may be used with the present invention.

The output equipment 320 receives programs and data from either the storage device 308 or the system controller 312. The output equipment 320 must receive the programs and data and determine the proper output connection to send the programs and data to remote sites 208, such as cable headends. Since, in the preferred embodiment, the output equipment 320 handles several video inputs and several outputs to remote sites 208, equipment for quality and flow control 340 are used by the output equipment 320 in the preferred embodiment. The CAP 316 communicates with the system controller 312 and determines how the final product of the operations center 202 (the programs and other information) will be packaged. In order to determine how the programs should be packaged, the CAP 316 can use a variety of different components.

In FIG. 2, the CAP 316 uses three components: a scheduler 324, a market research component 328 and an ad insertion component 332. In addition, to perform its functions, the CAP 316 utilizes databases 336. The scheduler component 324 creates the program lineup information necessary to determine what programs will be made available to which remote sites, when the programs will be made available to viewers (start times or video on demand periods), and schedules when the remote sites will receive the packaged product from the operations center 202. The market research component 328 receives and analyzes data on viewer requests for programs, program ratings, and the like to assist the scheduler component 324 in formulating a program lineup. The ad insertion component 332 determines what advertisements located at the operations center 202, as well as what advertisements located locally will be inserted into the program lineup. All three components, the scheduler 324, market research component 328, and ad insertion component 332, utilize databases 336 as needed to perform their functions. In addition, information received from remote sites 208, such as cable headends, are received by the CAP 316 in operations center 202. The CAP 316 is equipped with a port to receive signals from cable headends 208. For example, cable headend signal 344 is shown in FIG. 2 arriving at the operations center 202. This signal which contains buy data (program watched data), as well as cable franchise information, is generally processed by the CAP 316 and information is stored as necessary in the databases 336.

The system controller 312 constantly monitors all components in the system and ensures the smooth operation of the operations center 202. The optional holder 304 may be utilized to perform any preprocessing of signals prior to storing the signals in the storage device 308. As the number of incoming program and advertisement signals 212 increase, the holder 304 functions become more important. In many instances, the holder 304 may simply perform the function of buffering signals prior to reception by the storage device 308. With the above components, the operations center 202 is capable of receiving multiple program and advertisement signals 212, processing the signals and packaging the signals to be sent to one or more remote sites 208. Also, the operations center 202 is capable of handling real-time program feeds and passing the feeds quickly through the receiver 300, storage device 308 and output equipment 320 so that the programs can be quickly received by subscribers.

FIGS. 3a and 3b show two alternative embodiments for the receiver 300 and holder 304 combination of components. FIG. 3a shows a multiplexing receiver with a single connection to the holder 304 and FIG. 3b shows a non-multiplexing receiver with multiple connections to the holder 304.

FIG. 3a shows the receiver 300 receiving satellite signals 348 using integrated receiver components (IRC) 356 and integrated receiver demodulators (IRD) 360. The receiver 300 is also shown receiving terrestrial or land line signals 352. In addition, the receiver 300 is shown receiving NTSC formatted video signals, MPEG formatted video signals and ATM electronic signals containing MPEG formatted video signals. Since it is preferred that the holder 304 receive MPEG formatted video signals, the receiver 300 has the appropriate hardware to convert the received signals to MPEG video format. The holder 304 may also receive and store ATM signals, which is provided for by this receiver 300. More particularly, the receiver 300 has an MPEG encoder 364 which encodes NTSC video formatted signals into MPEG formatted video signals. The receiver 300 receives MPEG signals and buffers them, if necessary, using a buffer 368 as shown. For signals received in ATM signal format, the receiver 300 may either convert the ATM signal to a simple MPEG video data format signal using an ATM to MPEG converter 372 or it may simply buffer the signal using a buffer 376 prior to delivering the signal to the holder 304.

The receiver 300 obtains instructions from the system controller 312 which tells the receiver 300 which signals need to be passed on to the holder 304 and what format each signal must be in when it reaches the holder 304. Following the reception and proper conversion of the signals to correct format, the receiver 300 multiplexes the signals using a mux device 380. The multiplexing device 380 combines the signals as necessary to place them on a bus or other similar type of connection to the holder 304. It is preferred that the holder 304 be capable of receiving multiple program signals from the receiver 300 at the same time. The holder 304 is then expected to buffer the signal and perform any preprocessing on the signal prior to delivering the programs to the storage device 308.

Some of the preprocessing that may be done to the signal by the optional holder 304 includes: buffering, organizing of the video signals, calculations for interleaving (disk interleaving) the signals, encrypting of digital program signals such as MPEG, conversion of ATM to MPEG, or MPEG to ATM, and scrambling of programs. Thus, it is possible that some of the functions of the receiver 300 may be performed at the holder 304 or that the receiver 300 and holder 304 may share some functions, such as conversions from ATM to MPEG.

The holder 304 may organize the programming video data in such a manner that it is more easily stored in the storage device 308. This would include determining appropriate file locations in the storage device 308 for specific programs. This type of organizing of the programming data may include calculations of how the data may be interleaved in the storage device 308 so that the holder 304 may send the information to the storage device 308 in the appropriate manner to effectuate the interleaving. Various other preprocessing of the program signals may be conducted by the holder 304. Those skilled in the art will realize that the processing described may be done by the holder 304, or may be performed by shared processing responsibilities between the receiver 300, holder 304, and storage device 308.

The preferred hardware component for the holder 304 is a video file server system capable of handling multiple incoming video signals. Preferably, this video file server has less storage capacity than the storage device 308.

FIG. 3b shows an alternative embodiment of the receiver 300 and holder 304. The reference numerals in FIG. 3b carry the same meaning as in FIG. 3a. In FIG. 3b, the receiver 300 does not have a multiplexer and the holder 304 is capable of receiving multiple program signals through multiple ports 384. Those skilled in the art will recognize when building the system that, depending on the specific components, various additional buffering devices may be necessary for the smooth operation of the receiver 300, holder 304 and storage 308.

FIG. 4 is a diagram of the system controller 312. The system controller 312 has seven parts: a computer network server 400, a receiver controller 404, a holder control 408, a storage control 412, an output equipment control 416, a CAP interaction module 420, and an executive 424. In the preferred embodiment, the system controller 312 is made up of a mini-computer or powerful PC acting as a computer network server 400 and six PCs or similar computing devices with additional hardware as necessary. Each PC and associated hardware performs the functions of the six remaining parts of the system controller 312. One large processor may be configured to perform all the functions of the system controller 312.

The executive component 424 provides monitoring of the system controller's 312 status, as well as overall monitoring of the operations center 202 and provides information and statistics on the functioning of the operations center 202. This executive system 424 has various warning devices for informing personnel of problems in the operations center 202 and generates various reports on the functioning of the operations center 202. Preferably a windows-based graphical user interface capable of performing executive information system functions is provided at the executive component 424. A PC set up with multiple input ports and output ports and a printer can serve as the executive component 424.

The receiver controller 404 controls the receiver 300 by sending various control signals to the receiver 300. These include the selection of various input feeds to the receiver 300, the timing of the feeds, the format of the feeds and any conversion of formats that must be performed by the receiver 300. The receiver controller is preferably a PC with at least one connection to the receiver 300.

The holder control 408 controls the holder 304 through instructions informing the holder 304 of: time to buffer programs, names of programs, various directory information, event numbers for program events, and various tags. The holder control 408 also provides instructions to the holder 304 on preprocessing of the program signals if necessary. Preferably, a processor with memory and a connection to the holder 304 is used for the holder control 408.

The storage control 412 provides control information to the storage device 308 primarily informing the storage device 308 of which stored program files and on what schedule to output or spool the stored programs to the output equipment 320. The storage control 412 may also provide the storage device 308 with the program control information from the CAP 316 and various other information which instructs the storage device 308 in the method of packaging the stored programs for output to one or more remote sites. In certain instances, it is advantageous for the storage device 308 to store the program control information or other data sent by the storage control component 412.

The output equipment control 416 communicates configuration information to the output equipment 320, instructing the output equipment 320 on its proper configuration to accomplish the multiple output tasks at any given time. The output equipment control 416 closely monitors the quality and flow control 340 of the output equipment 320 to ensure that the packaged programs arrive at the remote sites 208. If necessary, the output equipment control 416 may send the program control information from the CAP 316 to the output equipment 320, or simple scheduling data may be sent directly to the output equipment 320 by the output equipment control 416 thereby bypassing the storage device 308. The CAP 316 and output equipment 320 can work together, for example, to schedule times and/or timing for transmission of program packages and control information.

In situations where the operations center 202 is supporting video on demand requests from subscribers, it may be more efficient for the output equipment control 416 to receive the program control information from the CAP interaction component 316 and send it to the output equipment 320 directly. Also, it is preferred that the output equipment control 416 instruct the output equipment 320 on video data format and signal format for any particular program package.

The CAP interaction module 420 provides the CAP 316 with necessary information from the other components of the operations center 202, enabling the CAP 316 to perform its functions. Specifically, the CAP interaction module 420 provides the CAP 316 with verification of programs received and programs available in storage 308 for scheduling and packing. In return, the CAP interaction module 420 receives from the CAP 316 scheduling information (which may or may not be embedded in program control information signals) including any ad insertions. It is preferred that the CAP 316 determine as far in advance the programs and the video format needed for those programs in order to satisfy the packaging of programs to the remote sites. Specifically, it is preferred that the CAP 316 inform the CAP interaction module 420 in advance that a particular program, such as Cheers, will be needed and that it is preferred if the program Cheers is available in the storage device 308 in two formats, an ATM format and a simple MPEG format. In this manner the CAP interaction module 420 can inform the various other components of the system control 312 and ensure in advance that the program Cheers is available on the storage device 308 in both needed formats. Preferably, a multipin cable or bus and ports are used to communicate between the CAP 316 and the CAP interaction module 420.

The CAP interaction module 420 must be able to quickly respond to subscriber video on demand requests which are being processed by the CAP 316. These video on demand requests may be received by the operations center 202 directly from subscribers or through the cable headend 208. To properly perform its functions, the CAP interaction module 420 must communicate to the other components of the system controller 312 the needs of the CAP 316, and must inform the CAP 316 of information that has been obtained by the various other components of the system controller 312. It is preferred that this communication between components of the system controller 312 be performed using the computer network server 400. However, it is possible that the components may communicate with each other through other means. For example, either through the executive 424 or through direct computer connections.

Figure 5:
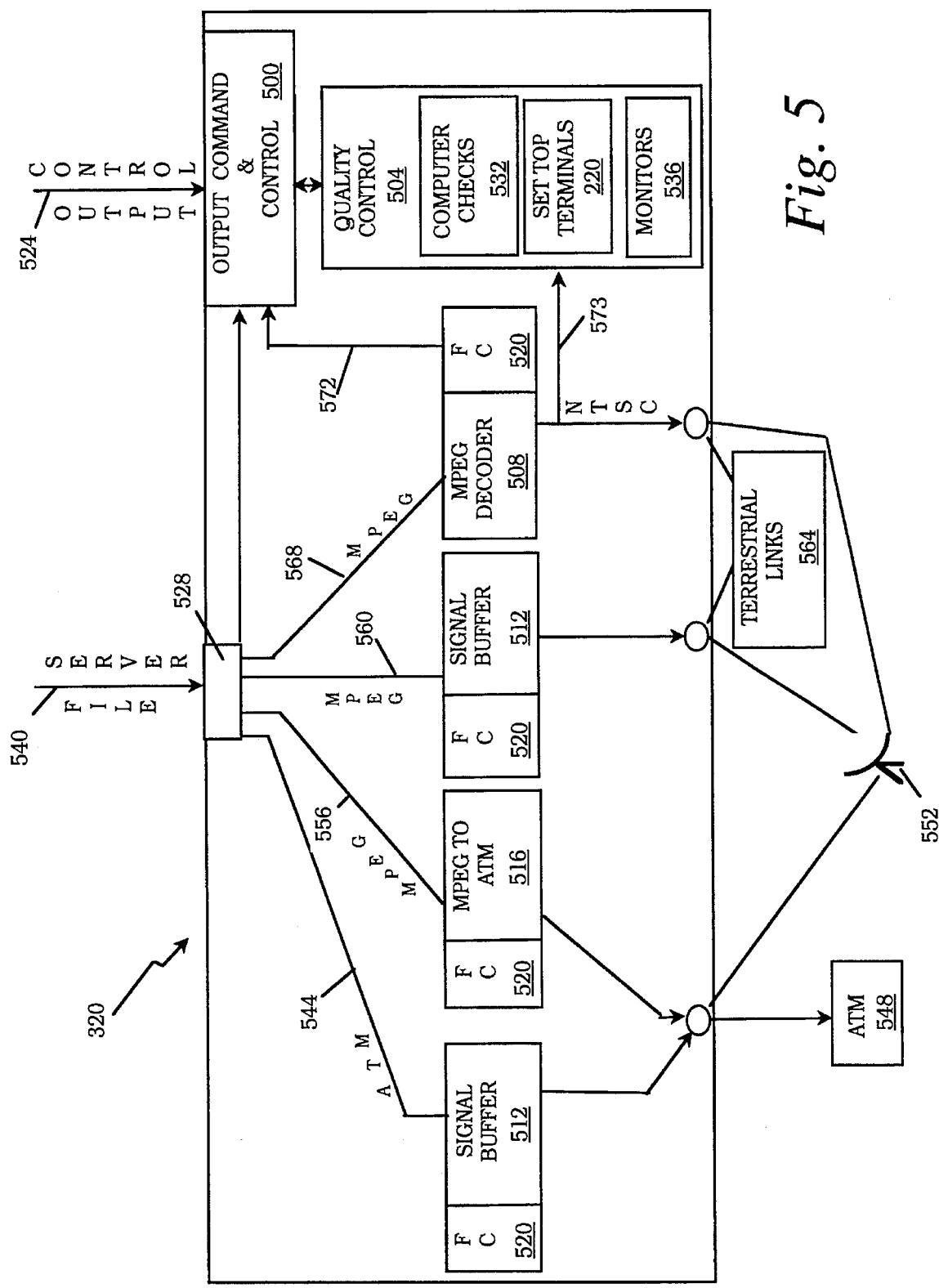
FIG. 5 is a schematic of the output equipment.

FIG. 5 is a schematic of the output equipment 320. The preferred output equipment 320 generally has six primary components: an output command and control module 500, a quality control module 504, an MPEG decoder 508, signal buffers 512, MPEG to ATM converter 516, and flow control modules 520.

The output command and control module 500 receives output control 524 from the system controller 312. It can also receive information 540 from the storage device 308 or file server, about the file server, through port 528 if necessary. This information may include the rate of flow of information from the storage device 308 to the output equipment 320. The output control signal 524 from the system controller 312 informs the output command and control module 500 of the electronic configuration needed for the packaged program outputs. This information would include data such as, that an MPEG signal being received from the storage device 308 with a particular header needs to be converted into NTSC video format using MPEG decoder 508. The output command and control module 500 communicates with the output equipment control component 416 of the system controller 312. The output command and control module 500 informs the output equipment control 416 of any quality and flow control problems.

The quality control module 504 checks the quality of the outgoing signals from the output equipment 320. To do so, the quality control module 504 is connected to the outputs of the MPEG decoder 508, signal buffers 512 and the MPEG to ATM converter 516 (an example of one such connection is shown at 573). It is preferred that the quality control module 504 use computer check equipment 532, set top terminals 220, and monitors 536 to perform its quality control functions. The computer check equipment 532 runs algorithms on the received data to try and determine that the quality of the video data is acceptable for subscribers. Those skilled in the art are aware of several algorithms available for this automatic computer check. The set top terminals 220 and monitors 536 work in unison to create a manual visual check. The set top terminals 220 convert the various signals which will be outputted by the output equipment 320 and display those signals on the monitors 536. Various combinations of multiple set top terminals 220 and multiple monitors 536 may be used to perform a random or continual manual visual check on the output equipment 320 signals.

FIG. 5 shows that the output equipment 320 receives a file server signal 540 which contains programming (video and audio and advertisements) preferably spooled from the storage device 308 (a file server). FIG. 5 shows that four possible output signals from the output equipment 320. Moving from left to right, the first one is an ATM signal 544 which is buffered and sent out in ATM format. A signal buffer 512 is used along with flow control 520 to monitor the ATM signal. The flow control 520 monitors the flow of the signal through the signal buffer 512 and signals the output command and control module 500 (connection now shown, but an example of one such connection is shown at 572) if the flow is too fast or too slow.

Generally, the ATM signal 544 has an MPEG encoded program within the signal. This ATM signal 544 is then output either to an ATM system 548 or a satellite uplink 552.

Moving to the second signal, an MPEG signal 556 is received by an MPEG to ATM converter 516 and flow control 520. The signal 556 is converted to an ATM format by converter 516 and the flow of the signal 556 is checked by flow control 520. Again, the flow control 520 reports to the output command and control module 500 any flow problems (connection not shown for simplicity). This converted signal is either sent to ATM system 548 or satellite uplink 552.

The next example, third from the left, is an MPEG signal 560. This MPEG signal 560 is simply buffered by signal buffer 512 and checked by flow control 520. The signal 560 is then sent through the output equipment to either a satellite uplink site 552 or terrestrial links 564.

The fourth signal, MPEG signal 568, is processed through an MPEG decoder 508 and flow control 520. Following the conversion, an NTSC signal is output either to a terrestrial link 564 or a satellite uplink 552. Again, the flow control 520 reports back to the output command and control 500. This is shown in this specific example by flow control signal 572. Similar connections are present in the buffer 512 and MPEG to ATM decoder 516.

Thus, with this configuration, the output equipment 320 can receive multiple program signals from the storage and spooling device 308 through the one signal 540 and port 528 shown. The programs on the signal 540 are processed through equipment such as signal buffers 512, MPEG decoder 508 and MPEG to ATM decoder 516. An output command and control module 500 monitors the output equipment 320, checking the quality and flow using quality control module 504 and flow control 520. Depending on the number of signals that must be simultaneously processed, the output equipment 320 may need a much larger capacity and many of the components shown or similar components may be duplicated to meet the need of the greater output of signals. In addition, the output equipment 320 may also be configured to handle analog scrambling and digital decryption. This is described subsequently in reference to FIG. 8.

Figure 6:
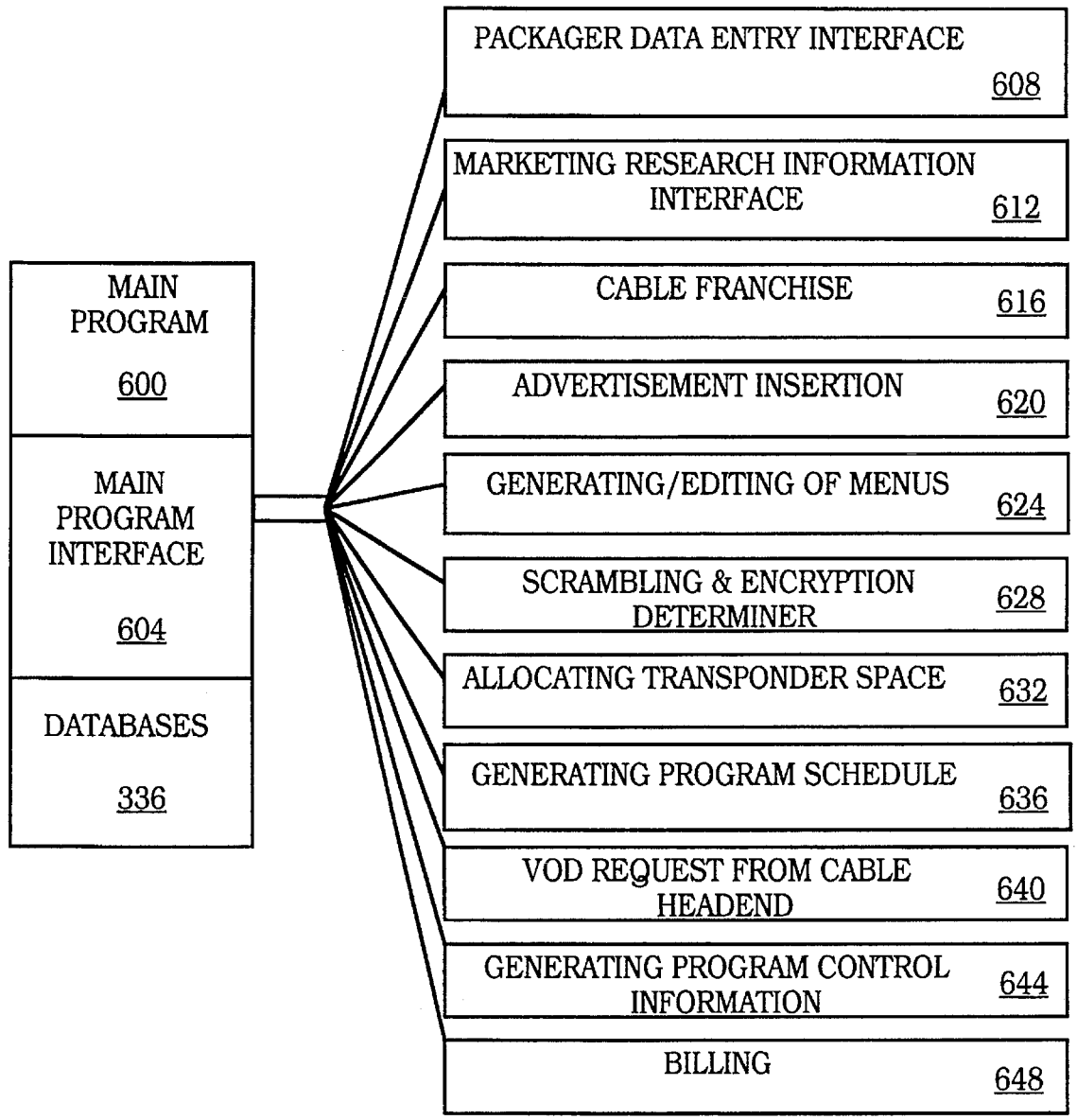
FIG. 6 is a diagram of the computer assisted packaging system.

FIG. 6 is a diagram of the routines which make up the CAP 316 and the attached databases 336. The CAP 316 has a main program 600 and main program interface 604 which control the software and hardware of the system. Databases 336 are accessed by the main program 600 or the subroutines as necessary. Various types of memory devices may be used to store the data that is necessary for the system. The databases contain information such as cable franchise, programs purchased or watched, advertisements available, menu templates, transponders, programs available, programs received (by the operations center) billing and collection site information. The cable franchise information preferably includes detailed data on video storage space, hardware configurations, set top terminals 220, types of services (e.g., NVOD, PPV, IPPV, VVOD, VOD) and signal and video data formats (and rates) required at each cable headend. In addition, source provider data (providers of programs and advertisements) including a director of programs available and expected time of receiving programs is stored in the databases 336. Data about the current operations center 202 transmission schedule, storage device 308 content and cable headend storage space allocated for special services or events is also maintained in the databases 336.

The CAP 316 preferably uses a hardware system similar to the system controller 312. That is, a network of PCs may be used with a computer network server. (See FIG. 7 for another example of a possible hardware configuration.) The main program 600 is the nerve center and controls the subroutines. The main program 600 may be located either at a computer network server or at a PC. Preferably, the main program is stored in an instruction memory with certain portions of the program being available in RAM at any given moment. Various other hardware configurations may be used to run the CAP 316 and the main program 600.

The CAP 316 must be capable of receiving outside signals from remote sites or cable headends such as a signal including the video on demand request from the subscriber. In order to accomplish this, preferably the CAP 316 has a port (not shown) for receiving this cable headend data. In addition, the CAP 316 must receive and provide data to the system controller 312. This is performed by the main program 600 or main program interface 604. Thus, when the system controller 312 needs to send data or receive data from the CAP 316, it will query either the main program 600 or the main program interface 604. Preferably, a bus connection is provided between the system controller 312 and the CAP 316.

The CAP 316 may receive information on incoming programs (such as title and length) from various sources. The information may be manually entered or the information may be received from the system controller 312 or directly from the external program sources 212. In the preferred embodiment, either the receiver hardware 300 is used to obtain this information or separate communication hardware such as a modem or port (not shown) may be used by the CAP 316.

Although eleven subroutines are shown on FIG. 6 for the CAP 316, it is possible to have additional features requiring more subroutines or to eliminate certain features and have less subroutines. It is also possible to configure the system to use more or less subroutines for the same functions. As with the system controller 312, separate PCs may be used to perform one or more of the subroutines shown. An instruction memory holding computer program instructions, a processor for executing stored computer program instructions and memory such as RAM may be used to effectuate the subroutines.

The eleven preferred subroutines shown on FIG. 6 are: the packager data entry interface 608, the marketing research information interface 612, cable franchise 616, advertisement insertion 620, generating and editing of menus 624, scrambling and encryption determiner 628, allocating transponder space 632, generating program schedule 636, video on demand request (from cable headend) 640, generating program control information 644, and billing 648. For the most part, these subroutines are capable of performing their functions without interacting with the other subroutines once they have received all the necessary information and data needed to perform their processing function. However, several of the subroutines perform better or more optimally if they interface with other subroutines allowing dynamic changes in the processing. For example, program schedules can be automatically generated by the generating program schedule routine 636 and menus can be automatically generated by the generating and editing of menus routine 624. However, it is preferred that a person, a packager, interface with these routines through the packager data entry interface 608. This allows the packager to ensure proper customizing of menus and program schedules for a particular remote site. In the preferred embodiment, the eleven subroutines call upon each other as necessary to perform optimally.

The packager data entry interface 608 is preferably a windows-based graphical user interface which allows a packager to interact with the CAP 316. This interaction includes initiation of routines in the CAP 316, and initiation of reception or sending of information to the computer system controller 312 or remote sites (such as a cable headend signal 344 or the like). The packager data entry interface 608 allows the packager to analyze market research information, cable franchise information, advertisement insertion information, menus, allocation of transponder space, program schedules and billing. In this manner, a packager is able to manually customize menus and program lineups, including advertisements, to be sent to remote sites.

The market research information interface 612 receives data from remote sites, such as the cable headend signal 344. The market research information interface 612 includes the appropriate associated hardware to receive the signal. After receiving raw data on market research, the routine 612 processes the information and stores data as necessary in databases 336. This market research information is then used in its processed form to aid in the generating of program schedules and menus.

The cable franchise routine 616 also processes information received from remote sites, such as the cable headend signal 344. The cable franchise routine 616 processes the data received on cable headend (or remote site) configurations and analyzes the data. The analysis determines for each headend, among other things, how much video storage space is available, types of menus needed, and what type of signal format and video data format is needed. Also, the cable franchise routine 616 analyzes the type of set top terminals help determine the type of menus and number of menus that will be needed at a cable headend site. This type of data is then stored in the database 336 as cable franchise information. Although much of this data can be preprocessed, in certain instances the menu generation routine 624, program schedule routine 636 and program control information routine 644 may need to interact with the cable franchise routine 616 in order to determine exactly what data (control data, menus, and programs) to send to a particular cable headend. For example, if a cable headend already has a particular program stored in memory, there is no need for the operations center 202 to send the program.

The advertisement insertion routine 620 receives data from the system controller 312 on advertisements that are available to be inserted and their storage location in the storage (and spooling) device 308. The advertisement insertion 620 also receives information on the geographic focus of the advertisement, the length of the advertisement, and information on when the advertisement should be inserted. The advertisement insertion routine 620 analyzes this type of data and stores part of the data in databases 336. As a program schedule is being generated by routine 636, the advertisement insertion routine 620 may be used to determine the identity of ads to insert at locations in the schedule or data stream. If the advertisement insertion data has been sufficiently processed, the program schedule generation routine 636 may be able to obtain all needed information from databases 336. In addition, the advertisement insertion routine 620 may accept advertisements or information on advertisements from external sources. It is preferred that all advertisements are stored in the storage device 308.

The generation and editing of menus routine 624 is an important routine, because it controls the menus seen by all the subscribers on their menu selection system. Menus can be either graphical displays or simple displays of text. The menus can be stored in MPEG video data format, as graphical data, as ASCII data, text data or other suitable format. Menus and menu templates may be stored in database 336 for use by the CAP 316. The routine 624 must both create aesthetically pleasing templates for menus, as well as customizing the menus with the appropriate program names, descriptions, abstracts, and, if necessary, start times. When menus are transmitted and when menus will first be made available to the subscriber is determined by the scheduling routine 636. The exact location a program name appears on a menu can be critical in marketing the program to the public. Therefore, even though menus can be automatically generated based on marketing information, editing changes made by a packager are usually preferred. Depending on whether a particular cable headend is a video on demand cable headend, near video on demand cable headend, or other type of program provider to subscribers, affects the way the generating and editing of menus 624 is conducted. For example, if the cable headend provides video on demand capability, then the generating and editing of menus 624 can be performed for the most part automatically with reference to the routine on generating program schedules 636 only to determine when a video on demand program is scheduled to first be made available to subscribers. The only scheduling that is needed by a scheduler or scheduling routine 636 is the time that menu information and programs will be sent to a cable headend by the operations center 202 and when those menus and programs will first be made available to subscribers. However, other types of services provided to subscribers, such as near video on demand and simple broadcast, require the program scheduler 636 and generating and editing of menus routine 624 to operate in unison, interacting as necessary to determine and schedule exact start times for programs.

The scrambling and encryption determiner 628 receives program scheduling information from the generating of program schedule 636 and determines (using stored information on cable franchises in the databases 336) what format the incoming programs and advertisements should be stored at the storage (and spooling) device 308. If the scrambling and encryption determiner 628 determines that a particular program needs to be sent out in more than one format, it informs the system controller 312 through the main program interface 604. The system controller 312 then informs the receiver 300 which can adapt itself to store programs in one or more formats. In an alternative embodiment, the scrambling and encryption determiner 628 determines the scrambling or encryption method needed for a particular program and that information is passed on to the output equipment 320 through the main program interface 604 and the system controller 312. The output equipment 320 then configures itself to handle the appropriate scrambling and encryption before transmission. Scrambling and encryption is further detailed in reference to FIG. 8 below.

Since the operations center 202 of the preferred embodiment will be sending some of its signals through satellite links, the CAP 316 allocates transponder space 632 on the satellites 206 and controls output through the output equipment 320 to accommodate the allocation of transponder space. The allocating of transponder space routine 632 receives data on transponder space available, as well as data about the cable franchises and the program schedules. The allocating transponder space routine 632 then analyzes this data and determines when a package (program control information signal along with the necessary programs) can be sent to a remote site using available transponder space. It is preferred that a packager analyze the allocation of transponder space using a graphical user interface with bar graphs or charts in colored format for quick visual checks. When necessary, the packager can reallocate transponder space using the allocating transponder space routine 632.

The generating program schedule routine 636 generates the lineup of programs, schedules which programs need to be sent to particular remote sites, and schedules the time that the programs need to be sent to the remote sites. With video on demand systems, particular program start times are less important. However, program lineups or program listings still need to be created and a time must be chosen for the programs or lineup to become first available to subscribers on a video on demand basis. To create the program lineup, the generating program schedule routine 636 uses marketing research information, cable franchise information, advertisement insertion information and entries from the packager data entry interface 608. Preferably, the program lineup is manually checked by the packager and changed as necessary to suit the needs of a particular remote site. Once the lineup is prepared, the generating program schedule routine 636 can determine which programs are not already available at the cable headend location and therefore need to be transmitted to the cable headend. Having determined the programs that must be transmitted, the generating program schedule 636 can determine the rough length of the transmission time needed to transmit the programs and can schedule or estimate a time to transmit a program package (the programs along with the program control information) to the cable headend location. When using transponder space, the allocating transponder space routine 632 is also involved in the process of determining when the transmission to the cable headend is scheduled.

Although the operations center 202 can handle video on demand requests that are received directly from subscribers via modem or other communication means, it is preferred that video on demand requests are filtered or received from remote sites or cable headends 208. The video on demand request routine 640 must be connected with the appropriate reception equipment (such as a modem or multiplexer) to receive signals from either the cable headend 208 or subscribers in order to process these video on demand request signals.

Upon receipt of a video on demand request, the routine 640 determines whether the program is available for distribution and whether there is a link available to distribute the program. In alternative embodiments, the video on demand request routine 640 may also determine whether the subscriber or cable headend 208 is entitled to receive the program and whether there are sufficient funds or credit for that subscriber or cable headend 208.

An important part of this routine is its ability to act in real time. It must receive the request, process it and have the program made available as soon as possible. Preferably this is done within seconds and no more than a few minutes. However, in the preferred embodiment, the operations center 202 has sent to the cable headend location the first few minutes of video for any program the cable headend has available to the subscriber. This "leader video" or first few minutes of video is generally stored in a local file server at the cable headend 208. In this way, when the cable headend receives the subscriber request for video on demand, it is able to immediately spool out the program requested (the leader video) from its local file server 214 in the cable headend 208. The cable headend spools out several minutes of programming immediately to the subscriber fulfilling his request within seconds (or possibly within a second). While the subscriber is viewing the first few minutes of his program from the local file server 214, the transaction can occur between the cable headend 208 and the operations center 202 in which the operations center 202 provides the cable headend with the program requested by the cable headend subscriber. Upon receipt of the program from the operations center 202, the cable headend 208 can seamlessly spool out the remainder of the requested program to the subscriber. Generally, the cable headend 208 will receive and store all but the first few minutes of video from the operations center 202 in real time. When the prestored first few minutes of video expires, the cable headend 208 seamlessly switches to the recently received and stored video (without leader sequence). This entire transaction is transparent to the subscriber. As far as the subscriber knows, the entire movie was available at the cable headend.

In fulfilling these video on demand requests at the operations center 202, the video on demand request routine 640 may need the ability to interrupt other processing occurring at the operations center 202 in order to gain processing power and fulfill a video request as quickly as possible.

When most of the routines in the CAP 316 have completed their functions in relation to a particular cable headend, the generating program control information routine 644 begins its processing. This routine 644 creates the data signal which becomes the program control information signal and is sent to remote sites informing each remote site of its program lineup, menus that have been provided and any other control information that is needed either by the remote site 208 (such as cable headend) or subscriber. This program control information is preferably generated in advance and stored at the storage (and spooling) device 308 until needed by the output equipment 320. Alternatively, the program control information can be stored in the databases 336 and sent through the system controller 312 to the output equipment 320, bypassing the storage (and spooling) device 308. In yet another embodiment, the program control information can be created in real time as it is needed to be sent out by the output equipment 320. Various data formats and signal formats may be used for the program control information signal. For a detailed frame format that may be used, please refer to the parent patent application, PCT/US93/11617, U.S. Ser. No. 08/160,282, entitled OPERATIONS CENTER FOR A TELEVISION PROGRAM PACKAGING AND DELIVERY SYSTEM filed on Dec. 2, 1993, and incorporated herein by reference.

The billing routine 648 tracks the charges incurred by cable headends and by specific subscribers to cable headends. The billing routine 648 monitors video on demand requests made through video on demand request routine 640 and monitors the program control information signal created by the CAP (routine 644) to determine the charges incurred by remote sites 208, cable headends and subscribers. The billing routine 648 tabulates this information and stores it in the databases 336. In the preferred embodiment, the invoices are generated at an external collection system site (not shown) and the billing routine 648 periodically transmits the necessary tabulations to the collection system site. This may be performed by a modem utilizing telephone system or through ATM or terrestrial links between the billing routine 648 and the collection system site (not shown).

The billing routine 648 may also flag subscribers or cable headends which are delinquent and not entitled to receive any more packaged programs or services from the operations center 202. This flag of warning information may be provided to the other routines within the CAP 316. A PC with a modem may be used to perform the billing functions.

For a more detailed description of the CAP software and the information stored in the databases 336, see PCT/US93/11617, U.S. Ser. No. 08/160,282, entitled OPERATIONS CENTER FOR A TELEVISION PROGRAM PACKAGING AND DELIVERY SYSTEM filed on Dec. 2, 1993, and incorporated herein by reference.

Using the described components, software, and databases the operations center 202 is able to perform the following tasks: receive and fulfill VOD requests (using CAP 316 and/or system controller 312), receive multiple program signals (using receiver 300), select a subset of the received programs on the program signals (using instructions from the system controller 312 or CAP 316), store the subset of the received programs (using the storage device 308), generate a list of programs (using the CAP 316), determine whether a remote site needs programs (or portions of programs for operations center VOD) on the program list (using the CAP 316), schedule the programs on the program list to be made available to subscribers and schedule a time for a transmission to a remote site (using the CAP 316), allocate bandwidth or transponder space (using the CAP 316), retrieve the programs needed by a remote site from the storage device (using the storage device 308, output equipment 320 or system controller 312), prepare (or package) one or more signals containing programs, a program list, a schedule, menus, and/or program control information for transmission (using the output equipment 320), transmit the signal (using output equipment 320 and/or an uplink site 204), and perform quality and flow checks (using quality and flow control 340). In addition, before transmission, the operations center may scramble, encrypt, or convert program signals using the receiver 300, holder 304, storage device 308, or output equipment 320 as described in reference to FIG. 8.

Also, the operations center 202 may create schedule, menus, and/or control signals to send to remote sites (using the CAP 316 and associated databases 336) and if necessary, store the schedule, menu and/or control signals in the storage device 308 before transmission. The control signals can include information on programs, schedules, advertisement insertion, menus, video on demand, and requests for buy data on programs watched. For purposes of many of these functions, advertisements, menus expressed in video data format, and video-audio programs are treated in the same manner and can be described as programs. Using the operations center described, nearly any data can be stored at the storage device 308, retrieved, and/or packaged and sent to the remote sites 208. Many other functions and subfunctions described elsewhere in the specification (such as billing) are also performed by the operations center 202 configuration described.

Figure 7:
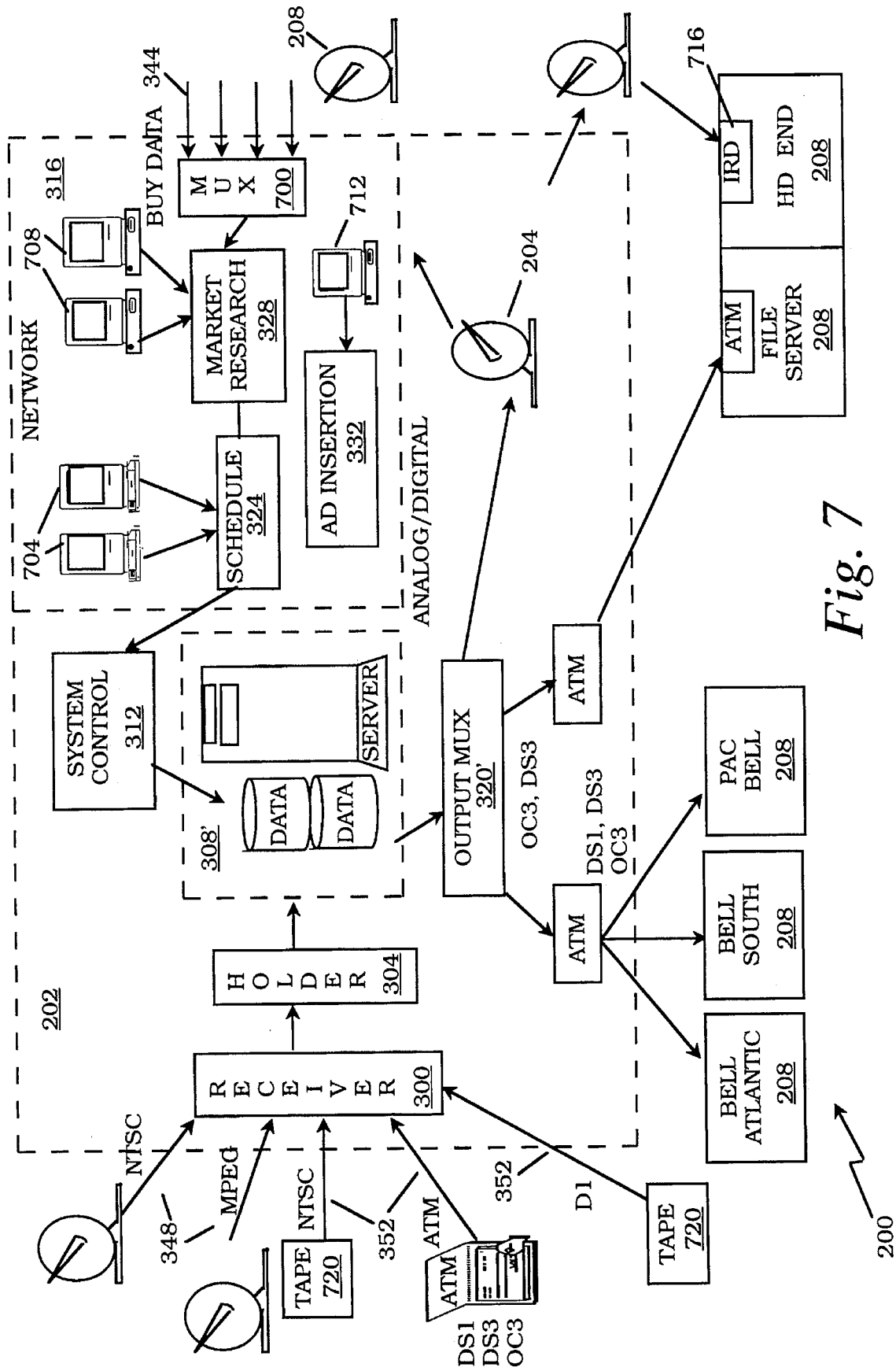
FIG. 7 is a schematic of one embodiment of the operations center.

FIG. 7 is an expanded schematic of a delivery system utilizing an embodiment of the operations center 202 of the present invention. Certain portions of the operations center 202 have been expanded upon in this schematic. This system is capable of supporting pay per view (PPV), impulse pay per view (IPPV), near video on demand (NVOD), VOD, virtual video on demand (VVOD), HDTV, Interactive TV and data delivery. Multiple signals are received at the operations center 202 and processed by the receiver 300. These received signals include satellite signals 348 received in NTSC format and MPEG format, as well as land line 352 signals received in NTSC video format, ATM or other formats. In particular, satellite dishes can receive signals such as those produced by ABC, CBS, NBC, HBO, DCI, and Showtime. Land line signals 352 may be received in various signal formats, for example DS1, DS3, OC3 and D1 formats. Additionally, these inputs to the operations center 202 may be from tape or other storage devices 720, as well as received through ATM switches. FIG. 7 shows the receiver 300 passing the program signals to the holder 304, which in turn passes it on to a storage (and spooling) device 308'.

Specifically, the storage and spooling device 308' utilized here is a video file server system with two data storage devices. The file server, as well as the holder 304 and receiver 300, are under the control of the system controller 312. The CAP 316 is shown in FIG. 7 as a network including terminals 704 and PCs 708. The CAP 316 is shown receiving buy data from cable headend signals 344 through a multiplexer 700. This multiplexed buy data from the cable headends is shown being received by the market research component 328. Several terminals 704 are shown connected to the scheduler 324 to perform scheduling functions and several PCs 708 are shown connected to the market research component 328 to perform market research functions. A PC 712 is also shown connected to the ad insertion component 332 performing ad insertion functions. In this particular embodiment, the ad insertion component 332 is shown directly connected to the file server 308' to provide ad insertion data directly to the file server software.

An output multiplexer 320' is shown as part of the output equipment in FIG. 7. The output multiplexer 320' sends signals in OC3 or DS3 signal format to ATMs and also sends analog or digital signals to an uplink site 204 with a satellite dish. The uplink site 204 is shown servicing a DBS or "PRIMESTAR"™ remote site 208, as well as a headend 208 with an integrated receiver demodulator 716. In this schematic, the output equipment 320' is servicing many different types of remote sites: a DBS or Primestar site 208, headend with satellite feed 208, a file server type headend system (verified by ATM 208), and video dialtone based systems, such as "BELL ATLANTIC"™ 208, "BELL SOUTH"™ 208 and "PACTEL"™ 208. This schematic highlights the multiple inputs, processing, and multiple outputs possible with the operations center 202. Using this operations center 202, hundreds of headends and remote sites may be serviced in a program delivery system 200.

For additional information on the delivery system shown in FIG. 7, see U.S. patent application Ser. No. 08/336,247, entitled ELECTRONIC BOOK SELECTION AND DELIVERY SYSTEM, filed on Nov. 7, 1994, by inventor John Hendricks, incorporated herein by reference.

Figure 8:
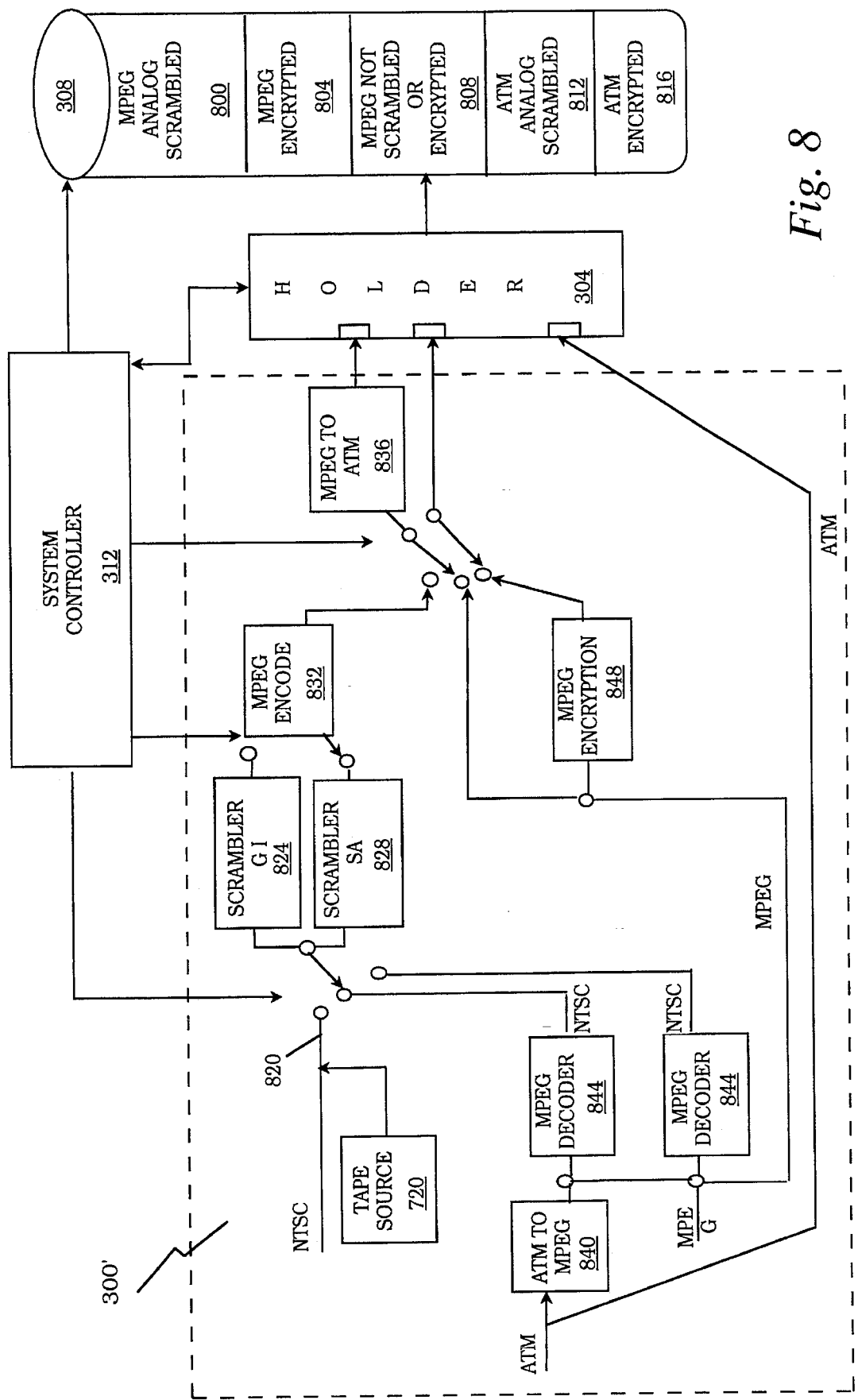
FIG. 8 is a schematic of an alternative embodiment of the operations center, which includes encryption and scrambling of signals.

FIG. 8 shows an alternative embodiment of the receiver 300, which enables the operations center 202 to handle analog scrambling and digital encryption of signals. Specifically, the receiver 300' is capable of performing any conversions necessary so that the storage device 308 may store any types of program signals which may be needed by remote sites 208. More specifically, the embodiment shown handles analog scrambled programs in MPEG digital format 800, MPEG encrypted programs 804, MPEG stored programs that are not scrambled or encrypted 808, ATM stored programs that are analog scrambled 812, and ATM programs in digital encrypted format 816.

The system controller 312 instructs the receiver 300', through one or more connections, on the signal formats that are needed for the various programs being received on the multiple inputs to the receiver 300'. Generally, the system controller 312 receives information from the CAP 316 (not shown in FIG. 8) on the scrambling and encryption of programs that is necessary prior to the programs being stored in storage device 308. More particularly, the scrambling and encryption determiner 628 of the CAP 316 (utilizing cable franchise information stored in the databases 336 and the program listing or lineup) informs the system controller 312 in advance of the desired program formats to be stored in the storage device 308. The system controller 312 then informs the receiver 300' of the program formats needed. The receiver 300' then, through a combination of hardware and software, configures itself appropriately to perform the conversions and send the appropriate converted programs to the holder 304. Various hardware or software switches may be used to achieve the desired effect in the receiver 300'.

To store MPEG analog scrambled programs 800 in the storage device 308, the receiver 300' processes the incoming signals through a variety of steps. For example, an NTSC signal 820 may be sent to either a "GENERAL INSTRUMENTS"™ (GI) scrambler 824 (a GI scrambler 824), or a "SCIENTIFIC ATLANTA"™ (SA) scrambler (SA scrambler 828). Once the analog NTSC signal 820 is processed by either analog scrambler 824, 828, then the analog scrambled signal may be processed by an MPEG encoder 832. When scrambling and MPEG encoding an analog signal, the included sync signal should be properly handled so that a set top terminal 220 can recreate the exact NTSC signal that existed prior to scrambling. Although the sync signal can be sent unscrambled, an unscrambled sync signal can be more easily pirated and become a security risk to cable operators. Generally, using standard equipment, scrambling an NTSC signal and running the scrambled signal through the MPEG encoder 832 will create synchronization problems. Popularly used scrambling techniques generally invert the sync signal and/or suppress the sync signal.

Although there are several methods of properly handling the sync signal, the preferred method is to route the sync signal around the scrambler 824, 828 to the MPEG encoder 832. Preferably, a stripping component (not shown) is used to strip the sync signal from the analog program signal prior to scrambling. This stripped sync signal is then routed to the MPEG encoder 832 or similar device. The sync signal is used by the MPEG encoder 832 (if needed for encoding) and modified as if it had been processed by the scrambler. To modify the sync signal, it is preferred that the sync scrambling technique be known in advance. The modified sync signal is then encoded into a data signal for later use in digital to analog conversion.

Preferably, the modified sync signal is inserted into the MPEG data stream using the MPEG private data packet format. When needed by a digital to analog converter, the MPEG private data packets are used to create a scrambled sync signal.

Following processing by the MPEG encoder 832, the signal is sent by the receiver 300' to the holder 304. The holder 304 may preprocess the program signal and pass it to the storage device 308 for storage in the appropriate location for MPEG analog scrambled signals 800. It is preferred that the scrambler encryption determiner 628 of the CAP 316 inform the system controller 312 of the desired scrambling method, GI 824 or SA 828. Thus, when the signal is finally spooled out by the storage device 308 to the output equipment 320, the spooled signal is in the exact analog scrambled format that is needed by the remote site 208 requesting the program. Alternatively, that MPEG analog scrambled signal 800 may be converted to an ATM format by the receiver 300' prior to being stored, using the MPEG to ATM converter 836. This ATM signal would then be stored as an ATM analog scrambled signal 812 at the storage device 308, and then spooled in ATM signal format.

Similarly, signals received in ATM format and signals received in MPEG format may be converted to NTSC analog video format so that they may be analog scrambled by a GI scrambler 824 or SA scrambler 828. To accomplish this, the receiver 300 uses an ATM to MPEG encoder 840 and MPEG decoders 844. Again, these signals are processed through analog scramblers 824, 828, the MPEG encoder 832 and then passed to the holder 304, or processed through the MPEG to ATM converter 836 before being sent to the holder 304.

If analog scrambling is not necessary or needed by the remote site 208, the programs may be stored in MPEG encrypted format 804, MPEG video format that is not scrambled or encrypted 808, or ATM digitally encrypted format 816. To accomplish this result, the receiver 300 may pass ATM signals directly to the holder 304 for storage in the storage device 308 (if the ATM signals are already digitally encrypted). Alternatively, the ATM signals may be converted to MPEG (using ATM to MPEG converter 840) then digitally encrypted while in MPEG format (using MPEG encryption 818) and then converted from MPEG back to ATM format (using the MPEG to ATM converter 836) and finally stored in the storage device 308.

Similarly, MPEG signals may either be passed through and stored as MPEG signals not scrambled or encrypted 808 or MPEG signals may be MPEG encrypted 804 using MPEG encryption device 848.

The result is that this embodiment of receiver 300' may accept a signal containing video in an ATM signal format, MPEG digital video format or NTSC analog video format; and perform any necessary scrambling, encryption and conversion so that the signal may be stored in storage device 308 in numerous formats. Those skilled in the art will recognize that numerous hardware and software variations of the design are possible to accomplish the multiple input, multiple outputs of this receiver 300' which handles scrambling, encryption and converting for later storage of the signal. Thus, the program signals may be spooled directly to the output equipment 320 in proper format for transmission.

As an alternative to a receiver 300' that is capable of handling scrambling, encryption and conversion, the operations center 202 may use output equipment 320 (not shown in FIG. 8) that is capable of similar scrambling, encryption and conversions prior to transmission. Equipment similar to that shown for the receiver 300' of FIG. 8 may be configured for the output equipment 320. In a large operations center 202 handling many headends, for reasons of efficiency, it is preferred that the receiver 300 perform the scrambling, encryption and conversion prior to storage. In smaller operations centers 202 for purposes of saving on disk storage space or other storage space (in storage device 308), it is preferred that the output equipment 320 perform the scrambling, encryptions and conversions necessary. When the output equipment 320 performs the scrambling, encryption and conversion, the programs only need to be stored in storage device 308 once, in one format. Thus, the output equipment 320 will handle any necessary changes in scrambling, encryption and conversion. When the scrambling, encryption and conversion is performed by the receiver 300, the storage device 308 must be larger, since each program may be stored numerous times in different formats.

Although the present invention has been shown and described with respect to preferred embodiments, various changes and modifications that are obvious to a person skilled in the art to which the invention pertains are deemed to lie within the spirit and scope of the invention as defined by the following claims.

What is claimed is:

1. An apparatus for use in an operation center for a video-audio program delivery system, wherein the operations center receives a plurality of programs from external sources, stores one or more of the received programs, generates a program schedule, and causes program identities and at least one of the stored programs to be sent to one or more remote sites, comprising:

means for receiving a plurality of programs provided from a plurality of external sources wherein one or more of the provided programs is individually identified;

means, connected to the receiving means, for storing at least one of the received and identified programs for subsequent retrieval;

control means, connected to the receiving means and storing means, for providing communication and control;

computer assisted means, connected to the control means, for generating a program schedule comprising program identities and an associated time for sending one or more of the stored programs to a remote site;

output means, connected to the control means and storing means, for sending program identities and programs to one or more remote site, wherein the program identities are included in the program schedule and wherein the output means obtains one or more of the stored programs identified in the program schedule from the storing means to send to the remote sites; and wherein at least one stored program obtained by the output means from the storing means is individually retrieved from the storing means.

2. The apparatus of claim 1, wherein the control means further comprises:

means for creating a set of control instructions wherein the control instructions are used for communication of control information between the control means, the receiving means, the computer assisted means, the storing means, and the output means; and wherein the control means controls the sending of programs by the output means.

3. The apparatus of claim 1, wherein the computer assisted means comprises:

means for generating a program control information signal containing specific transmission times for the output means to send programs to remote sites and the program schedule with program identities; and wherein the output means obtains the program control information signal from the generating means.

4. The apparatus of claim 1, wherein the storing means further comprises:

means for storing the program schedule for subsequent retrieval, wherein the computer assisted means communicates the generated program schedule to the storing means, and wherein the control means retrieves the program schedule from the storing means; and means, connected to the output means and control means, for dumping the retrieved program schedule from the control means to the output means.

5. The apparatus of claim 1, wherein the output means comprises:

means for transmitting video formatted signals of one or more of the stored programs identified in the program schedule; and means for transmitting a data signal of a portion of the program schedule including the program identifies, wherein only portions of the program schedule needed by the remote site are transmitted.

6. The apparatus of claim 1, wherein the output means further comprises:

means for checking quality and flow of output wherein the output means communicates quality and flow information to the control means.

7. The apparatus of claim 1, wherein the output means sends the stored programs and the entire program schedule as a series of data signals, the output means comprising:

flow control means for checking the flow of the data signals through the output;

quality control means for checking the quality of the data signals representing the programs; and a command and control module connected to the control means, flow control means and quality control means, for monitoring the flow control means and quality control means and communicating quality and flow information to the control means.

8. The apparatus of claim 1, wherein the storing means is a digital storage means, and the output means comprises:

means, connected to the digital storage means, for encrypting at least one of the obtained programs prior to sending the obtained programs to the remote sites, wherein an encrypted program is sent to at least one remote site;

means, connected to the digital storage means, for converting at least one the obtained programs from a digital program to an analog program, wherein the obtained program is a digital program; and means for scrambling at least one of the analog programs prior to sending the obtained programs to the remote site.

9. The apparatus of claim 8, wherein the computer assisted means comprises:

means, connected to the encrypting means, for determining obtained programs to encrypt;

means, connected to the converting means, for determining obtained programs to convert; and means, connected to the scrambling means, for determining analog programs to scramble.

10. The apparatus of claim 1, wherein the receiving means further comprises:

means for receiving satellite transponder program signals; and means for receiving terrestrial link program signals.

11. The apparatus of claim 1, wherein the receiving means comprises an NTSC receiving means, the apparatus further comprising:

means, connected to the NTSC receiving means, for scrambling the received plurality of programs; and means, connected to the storage means and scrambling means, for digitally encoding the scrambled programs before storage in the storage means.

12. The apparatus of claim 1, wherein the receiving means is a digital receiving means and the digital receiving means comprises:

means for encrypting programs in digital format, wherein programs in digital format are encrypted before storage.

13. The apparatus of claim 1, wherein the receiving means further comprises a means for receiving advertisements and the storing means further comprises a means for storing advertisements.

14. The apparatus of claim 1, wherein the provided programs are formatted in a plurality of signal formats, and wherein the receiving means is capable of receiving programs of different signal formats, and wherein the receiving means comprises a converter means for converting received programs from one signal format to another signal format based on communications from the control means.

15. The apparatus of claim 14, wherein the converter means comprises:
   an NTSC converter for converting NTSC format programs to MPEG format programs; and
   an ATM converter for converting ATM format programs to MPEG format programs.

16. The apparatus of claim 1, wherein the storing means comprises:
   means for spooling the stored programs to the output means wherein stored programs identified in the generated program schedule are spooled to the output means at the scheduled time.

17. The apparatus of claim 16, wherein the means for spooling comprises:
   a video file server system for spooling of programs to the output means, the video file server comprising:
      a redundant array of independent disks for storing the programs on disks, wherein the programs may be quickly spooled to the output means.

18. The apparatus of claim 1 further comprising a database, connected to the computer assisted means, for maintaining marketing information and wherein the computer assisted means comprises:
   means for performing marketing research using the market information stored in the database.

19. The apparatus of claim 1 further comprising a database, connected to the computer assisted means, for maintaining information on advertisements available for insertion such as advertisement identities, and wherein the computer assisted means further comprises:
   means for inserting advertisements and advertisement identities into the generated program schedule.

20. The apparatus of claim 1 further comprising a database of programs available for video on demand, and wherein the computer assisted means comprises:
   means for receiving a video on demand request from a remote site;
   means, connected to the means for receiving a video on demand request, for searching the database to determine whether the requested video is available; and
   means, connected to the searching means and output means, for responding to a video on demand request.

21. The apparatus of claim 1, wherein the remote sites provide information to the operations center, the apparatus further comprising a database, connected to the computer assisted means, for maintaining information concerning the remote sites.

22. The apparatus of claim 1 further comprising a database of information concerning remote sites connected to the computer assisted means, and wherein the computer assisted means comprises:
   means for analyzing the information concerning remote sites in the database;
   means, connected to the analyzing means, for selecting a set of programs to customize programs available at a specified remote site, wherein the selecting means uses an analysis from the analysis means; and
   means, connected to the selecting means, for restricting the program identities in the schedule of programs to the set of selected programs.

23. The apparatus of claim 1, wherein program schedules can be customized for a group of subscribers and the computer assisted means further comprises:
   means for customizing the program schedule for a group of subscribers, wherein the computer assisted means has information about a group of subscribers to use in customizing the program schedule.

24. The apparatus of claim 1, wherein the computer assisted means further comprises:
   a graphical user interface for allowing manual entries into the computer assisted means including entries to effect the generation of program schedules.

25. The apparatus of claim 1, wherein the computer assisted means further comprises:
   means for creating instructions on the allocation of transponder space for one or more transponders located on one or more satellites, wherein the instructions are used by the output means to send programs.

26. The apparatus of claim 1, wherein subscriber purchasing information is maintained at the operations center, the apparatus further comprising:
   a database, connected to the computer assisted means, for maintaining subscriber purchasing information; and
   wherein the computer assisted means further comprises:
      means for accepting information concerning purchases of programs by subscribers, wherein the information concerning purchases is used by the database; and
      means for compiling billing information based on subscriber purchasing information in the database.

27. The apparatus of claim 1, wherein the operations center supports operations center video on demand to subscribers, the computer assisted means comprising:
   means for accepting a video on demand program request from a remote site or directly from a subscriber; and
   means, connected to the accepting means, for determining whether the requested video on demand program is available to be sent, wherein the output means sends the program requested if the program is determined to be available by the determining means.

28. The apparatus of claim 27, wherein the remote sites store beginning portions of programs which can be requested from the operations center in a video on demand basis, the computer assisted means further comprising:
   VOD scheduling means for scheduling beginning portions of programs which are available on a video on demand basis from the operations center to be sent to remote sites, wherein the output means sends beginning portions of programs when scheduled by the VOD scheduling means so that the remote sites can provide subscribers with the beginning portion of a video on demand program prior to receiving the entire video on demand program from the output means.

29. The apparatus of claim 1, wherein the output means sends packages of programs to remote sites, the computer assisted means comprising:
   means for creating data on assembling packages of programs to be sent to remote sites so that the packages contain program control information and multiple programs wherein the program control information includes multiple program identities and multiple menus related to the program identities and the multiple programs include programs identified by the program identities; and wherein the control means comprises means for instructing on the assembling of the programs and program control information so that a packaged signal is sent to the remote site by the output means.

30. The apparatus of claim 1, wherein one or more remote sites comprise a means for recording at least one program sent to the remote site.

31. The apparatus of claim 30, wherein the recording means comprises a file server.

32. The apparatus of claim 1, wherein the programs sent by the output means are portions of requested programs and wherein the remote site transmits an entire program on demand to subscribers by obtaining subscriber requests for available programs, wherein the remote site transmits a first portion of the requested program from local storage to the subscriber, receives a second portion of the requested program, and transmits the second portion of the program to the subscriber, the remote site comprising:

means for obtaining subscriber requests of available programs;

means for locally storing available programs, wherein the first portions of available programs are locally stored;

means, connected to the obtaining means, for communicating subscriber requests to the control means;

means, connected to the means for locally storing, for receiving programs including second portions of requested programs, sent from the output means; and means, connected to the means for locally storing, for transmitting an entire program to the subscriber upon subscriber request, wherein the second portion is transmitted subsequent to the first portion.

33. The apparatus of claim 32, wherein the remote site stores the second portion of the requested program in the means for locally storing.

34. The apparatus of claim 1, wherein the remote sites are subscriber locations and wherein the computer assisted means generates subscriber specific menus and sends the menus to subscribers through the output means.

35. The apparatus of claim 1, wherein the computer assisted means further comprises means for generating menus, and wherein the menus generated by the computer assisted means are stored in the storing means for subsequent recall and output.

36. The apparatus of clam 1, wherein the remote sites are cable headends and wherein the computer assisted means further comprises means for generating headend specific menus, and wherein the menus are sent to the cable headends through the output means.

37. An apparatus for use in an operation center for a video-audio program delivery system, wherein the operations center receives a plurality of programs from external sources, stores one or more of the received programs, generates a program schedule, and causes program identities and at least one of the stored programs to be sent to one or more remote sites, comprising:

means for receiving a plurality of programs provided from a plurality of external sources comprising a holder means, connected to storing means, for holding the received plurality of program signals before making the program signals available to the storing means, wherein one or more of the provided programs is individually identified;

means, connected to the receiving means, for storing at least one of the received and identified programs for subsequent retrieval;

control means, connected to the receiving means and storing means, for providing communication and control;

computer assisted means, connected to the control means, for generating a program schedule comprising program identities and associated time for sending one or more of the stored programs to a remote site;

output means, connected to the control means and storing means, for sending program identities and programs to one or more remote site, wherein the program identities are included in the program schedule and wherein the output means obtains one or more of the stored programs identified in the program schedule from the storing means to send to the remote sites.

38. The apparatus of claims 37, wherein the holding means further comprises means for processing the received programs while the program signals are being held.

39. The apparatus of claim 37, wherein the holder means is connected to the control means and the holder means further comprises means for interpreting communications from the control means to determine how long to hold the received programs.

40. An apparatus for use in an operation center for a video-audio program delivery system, wherein the operations center receives a plurality of programs from external sources, stores one or more of the received programs, generates a program schedule, and causes program identities and at least one of the stored programs to be sent to one or more remote sites, comprising:

means for receiving a plurality of programs provided from a plurality of external sources wherein one or more of the provided programs is individually identified;

means, connected to the receiving means, for storing at least one of the received and identified programs for subsequent retrieval;

control means, connected to the receiving means and storing means, for providing communication and control;

computer assisted means, connected to the control means, for generating a program schedule comprising program identities and associated time for sending one or more of the stored programs to a remote site, comprising:

means for generating menus wherein program identities are used in generating menus; and means for editing the generated menus, wherein the edited menus are output to the remote sites for eventual use by the subscribers in selecting program identities; and output means, connected to the control means and storing means, for sending program identities and programs to one or more remote site, wherein the program identities are included in the program schedule and wherein the output means obtains one or more of the stored programs identified in the program schedule from the storing means to send to the remote sites.

41. The apparatus of claim 27, wherein the computer assisted means further comprises:

means for representing the generated menus in a digital video format, wherein the menus represented in digital video format may be stored in the storing means.

42. An apparatus for use in an operation center for a video-audio program delivery system, wherein the operations center receives a plurality of programs from external sources, stores one or more of the received programs, generates a program schedule, and causes program identities and at least one of the stored programs to be sent to one or more remote sites, and wherein the remote sites provide subscribers with video on demand programs and the apparatus is capable of supporting the video on demand at remote sites, comprising:

means for receiving a plurality of programs provided from a plurality of external sources wherein one or more of the provided programs is individually identified;

means, connected to the receiving means, for storing at least one of the received and identified programs for subsequent retrieval;

control means, connected to the receiving means and storing means, for providing communication and control;

computer assisted means, connected to the control means, for generating a program schedule comprising program identities and associated time for sending one or more of the stored programs to a remote site, comprising:

means for generating video on demand menus with program identities of programs which are available on a video on demand basis, wherein the video on demand menus are sent to remote sites for subscriber use;

means for determining a time when the generated video on demand menus will be made available to subscriber's at a remote site; and means, connected to the determining means, for scheduling one or more video on demand programs identified in the video on demand menus to be sent to the remote site, wherein the video on demand programs will be available at the remote site prior to the determined time that the menus with video on demand program identities will be made available to subscriber's at that remote site; and output means, connected to the control means and storing means, for sending program identities and programs to one or more remote site, wherein the program identities are included in the program schedule and wherein the output means obtains one or more of the stored programs identified in the program schedule from the storing means to send to the remote sites.

43. An apparatus for use with an operations center which obtains programs from program signal sources and provides customized packaged program signals from the operations center to one or more cable headends, the apparatus comprising:

a receiver for receiving program signals from program signal sources, the program signals representing programs, the receiver including means for receiving program signals of different signal formats;

a computer assisted means for generating program control information signals containing customized instructions relating to the packaging of program signals including the identities of program signals destined for one or more specified cable headend;

a video file server, connected to the receiver and computer assisted means, for storing the received program signals and the program control information signals, comprising:

a means for spooling stored program control information signals and stored program signals wherein the stored program signals identified in a particular program control information signal are spooled in accordance with the customized instructions in the program control information signal, and wherein the spooling creates a customized package of programs signals; and a means, connected to the video file server, for transmitting a customized package of program signals with its corresponding program control information signal to one or more cable headends.

44. The apparatus of claim 43 further comprising a controller for controlling communications between the receiver, computer assisted means, video file server and transmitting means, and wherein the computer assisted means receives communications on program signals stored in the video file server.

45. The apparatus of claim 44, wherein cable headends store beginning portions of programs for distributing to subscribers during the time period that an operations center video on demand request is being filled, and wherein the means for spooling further comprises means for spooling portions of programs to be sent to cable headends.

46. The apparatus of claim 43, wherein the apparatus supports the operations center as a source for video on demand programs to requesting cable headends, and wherein the computer assisted means further comprises:

means for accepting a video on demand request from a requesting cable headend;

means, connected to the accepting means, for determining how the video on demand request can be filled and generating customized instructions on sending the program requested to the requesting cable headend; and means for placing the customized instructions in the program control information signal.

47. A method for packaging programs for delivery from an operations center to one or more cable headends, wherein programs are received from external sources and stored in a storage media at the operations center for subsequent transmission to each cable headend, comprising the steps of:

receiving a plurality of programs at the operations center which are provided from one or more external sources;

identifying a first set of programs, the first set of programs comprised of one or more of the received programs;

storing the first set of programs in a storage media for subsequent retrieval;

generating a program list comprising the identities of one or more of the stored programs;

determining a second set of programs, the second set of programs comprised of one or more of the stored programs that are included on the program list;

retrieving the second set of programs from the storage media;

encoding the program list and retrieved programs for transmission; and transmitting the encoded program list and programs from the operations center to one or more cable headend.

48. The method of claim 47, wherein the step of generating a program list comprises the steps of:

identifying types of programs each cable headend desires to receive;

accessing a database to obtain information concerning the types of programs available; and selecting programs for inclusion onto the program list based on the obtained information and the identified types of programs.

49. The method of claim 48, wherein databases store market, video on demand and advertisement information about each cable headend, and wherein the step of identifying the types of programs each cable headend desires to receive comprises the steps of:

examining databases on specific market, video on demand and advertisement information for a cable headend; and analyzing the examined information to determine the types of programs desired by a cable headend, wherein the types of programs include video on demand and advertisement programs.

50. The method of claim 47, wherein the step of generating a program list comprises the steps of:

creating program menus for downloading to specified cable headends;

storing the program menus in the storage media for subsequent retrieval, wherein the menus are retrieved in a manner similar to the retrieval of stored programs; and including the retrieved program menus as items in the program list so that some of the retrieved program menus are included in the second set of programs, wherein one or more program menus are retrieved, encoded, and transmitted with programs to each specified cable headend.

51. The method of claim 47, wherein a controller monitors the packaging of programs for delivery, and the step of transmitting comprises the steps of:

performing quality and flow checking while transmitting the encoded program list and programs; and notifying the controller if there are problems with the quality or flow, such that there is an opportunity for the controller to correct for errors in transmission.

52. The method of claim 47, wherein the step of encoding comprises the steps of:

packaging the retrieved programs and program list into a package signal so that the program list and retrieved programs are packaged together as a continuous signal and transmitted as a single packaged signal to the cable headends.

53. The method of claim 47, wherein the step of encoding further comprises the steps of:

identifying whether any of the retrieved programs should be scrambled for use by a cable headend in scrambled form;

identifying whether any of the retrieved programs should be encrypted for use by a cable headend in encrypted form;

identifying whether any of the retrieved programs should be converted to a specific signal format before transmission; and performing signal scrambling, encryption and conversion according to the identifications of scrambling, encryption, or conversion so that the encoded program and program list are in the correct format, and are in the correct scrambled and encrypted state for transmission to one or more cable headends.

54. The method of claim 47, wherein the method further comprises the step of:

acquiring information at the operations center from each cable headend relating to subscriber preferences, billing, desired programming, advertising, or marketing, wherein the acquired information may be used in generating a program list.

55. The method of claim 47, wherein the step of generating the program list comprises the steps of:

examining program schedules of the one or more stored programs to determine times that the one or more stored programs are scheduled to be shown to subscribers of a cable headend; and selecting the programs for inclusion onto the program list for the cable headend at a time which occurs prior to a time when the stored program is scheduled for showing to subscribers so that a program is not retrieved for transmission to the cable headends until some time before the subscribers require the program.

56. The method of claim 47, wherein the step of determining a second set of programs comprises the steps of:

examining the program list to determine times when the one or more stored programs are scheduled to be shown to subscribers of the cable headends; and selecting programs for inclusion onto the second set of programs at a time which occurs prior to a time when the stored program is scheduled for showing to subscribers and selecting only those programs which have not been recently sent to the cable headend, wherein the cable headend is not sent programs that the cable headend already has stored or which the cable headend does not need before the next scheduled transmission from the operations center.

57. The method of claim 47 wherein the plurality programs are received in NTSC, MPEG, or ATM format from the external sources, the method further comprising the step of processing the first set of programs, the processing step comprising one or more of the following steps of:

scrambling an NTSC formatted program;

converting an MPEG formatted program to an ATM format program;

decoding an MPEG formatted program to a NTSC format program;

converting a scrambled NTSC formatted program to a MPEG format program;

converting an ATM formatted program to a MPEG format program;

encrypting a MPEG formatted program; and wherein the storing step comprises the step of storing the processed first set of programs.

58. The method of claim 47, wherein control information is stored and transmitted to the cable headends, further comprising the steps of:

generating program control information, wherein the program control information contains information on programs in the second set of programs;

storing the program control information in a memory device;

retrieving at least part of the program control information from the memory device; and transmitting the retrieved program control information to at least one cable headend.

59. The method of claim 47, wherein the received programs are held for a time period before they are stored, further comprising the step of:

holding the first set of programs for a time period prior to the step of storing the first set of programs.

60. The method of claim 47, wherein the storage media is a file server with software and wherein the step of retrieving comprises the step of the file server software spooling the second set of programs, such that the spooling of programs occurs prior to transmission.

61. A method for packaging programs and a program control information signal for delivery from an operations center to one or more cable headends, using a video file server at the operations center to retrieve, spool and package programs for transmission to one or more cable headends, the method comprising the steps of:

receiving a plurality of program signals representing a plurality of programs at the operations center, the plurality of program signals presented in one or more signal formats;

storing one or more of the received program signals in the video file server for later retrieval;

generating the program control information signal which contains information concerning one or more of the stored program signals;

storing the program control information signal in the video file server for later retrieval;

retrieving the stored program control information signal and one or more of the stored programs;

spooling and packaging the retrieved programs and the program control information signal to form a packaged signal, wherein the program control information signal and programs are packaged to form a continuous packaged signal; and transmitting the continuous packaged signal to one or more cable headends, wherein packaged programming is provided to one or more cable headends.

62. The method of claim 61 wherein menus are sent to cable headends for use by subscribers in selecting programs, the method further comprising the steps of:

creating menus which contain information about one or more programs stored in the video file server;

storing the created menus in video data format in the file server for later retrieval; and wherein the spooling and packaging step comprises the steps of:

spooling the stored menus from the video file server, wherein the spooled menus contain information on one or more of the same programs as the spooled program control information signal; and packaging the spooled menus with the spooled program control information and spooled programs.

63. An operations center which receives video programs, stores the video programs in a file server, generates a schedule, and outputs the schedule as well as scheduled programs to remote sites, the operations center comprising:

a video program receiver, comprising at least one of an encoder, converter and input buffer;

a first file server, operably connected to the video program receiver, having a storage capacity sufficient to store two or more received video programs and having an output connected to one or more distribution ports;

a system controller containing a processor, connected to the first file server;

a computer assisted packaging device, in communication with the system controller, running program packaging software and comprising a scheduler; and output equipment, operably connected to the one or more distribution ports and system controller, comprising at least one of an output buffer and decoder, and wherein the program packages and schedule determined by the computer assisted packaging device are passed to the remote sites.

64. The operations center of claim 63, further comprising:

a holder, connected to the video program receiver and the first file server, containing a preprocessor to act upon the received video programs prior to storage in the first file server, wherein the first file server is operably connected to the program receiver through the holder.

65. The operations center of claim 64, wherein the holder comprises a second file server having less storage capacity than the first file server.

66. The operations center of claim 64, wherein the holder requires a specific data format and wherein the receiver further comprises a multiplexer, connected to each encoder, converter and input buffer.

67. The operations center of claim 63, wherein the output equipment further comprises:

a flow control connected to monitor the output signal.

68. The operations center of claim 63, wherein the receiver contains an MPEG encoder and wherein the output equipment contains an MPEG decoder.

69. The operations center of claim 63, wherein the receiver contains an ATM to MPEG converter and the output equipment contains an MPEG to ATM converter.

* * * * *